(12) United States Patent
Nanisetty

(10) Patent No.: US 12,471,855 B2
(45) Date of Patent: Nov. 18, 2025

(54) PERSONAL ALARM APPARATUS, SYSTEM, AND METHOD

(71) Applicant: Avinash Raghu Nanisetty, Arlington Heights, IL (US)

(72) Inventor: Avinash Raghu Nanisetty, Arlington Heights, IL (US)

( * ) Notice: Subject to any disclaimer, the term of this patent is extended or adjusted under 35 U.S.C. 154(b) by 41 days.

(21) Appl. No.: 18/114,010

(22) Filed: Feb. 24, 2023

(65) Prior Publication Data

US 2024/0285242 A1    Aug. 29, 2024

(51) Int. Cl.
*A61B 5/00* (2006.01)
*A61B 5/11* (2006.01)

(52) U.S. Cl.
CPC ............ *A61B 5/746* (2013.01); *A61B 5/1126* (2013.01); *A61B 5/6891* (2013.01); *A61B 5/6898* (2013.01)

(58) Field of Classification Search
CPC ..... A61B 5/746; A61B 5/1126; A61B 5/6891; A61B 5/6898
See application file for complete search history.

(56) References Cited

U.S. PATENT DOCUMENTS

| | | |
|---|---|---|
| 5,737,787 A | 4/1998 | Iozef |
| 5,813,065 A | 9/1998 | Tinhorn |
| 6,236,621 B1 | 5/2001 | Schettino |
| 6,386,201 B1 * | 5/2002 | Fard .......................... A61F 5/56 5/904 |
| 7,266,047 B2 | 9/2007 | Chan |
| 7,289,036 B2 | 10/2007 | Salzhauer et al. |
| 7,461,422 B1 | 12/2008 | Baker |
| 8,699,306 B2 | 4/2014 | Estrada et al. |
| 10,600,291 B2 | 3/2020 | Kashar |
| 10,805,742 B2 | 10/2020 | van Gerwen |
| 10,870,003 B2 | 12/2020 | Gordon et al. |
| 2005/0211247 A1 * | 9/2005 | Noda ..................... A61B 7/003 128/204.23 |
| 2013/0135137 A1 * | 5/2013 | Mulder ..................... G01S 3/48 342/28 |
| 2017/0033942 A1 * | 2/2017 | Koeninger ............ H04L 12/282 |
| 2022/0155737 A1 * | 5/2022 | Gartenberg .......... G05B 19/042 |

FOREIGN PATENT DOCUMENTS

| | | |
|---|---|---|
| CN | 215457082 U | 1/2022 |
| EP | 1913567 A2 | 4/2008 |
| FR | 2996997 A1 | 4/2014 |
| GB | 2561174 A | 10/2018 |
| JP | 2006034465 A | 2/2006 |
| JP | 2019051068 A | 4/2019 |
| KR | 101408117 B1 | 6/2014 |

\* cited by examiner

*Primary Examiner* — James J Yang
(74) *Attorney, Agent, or Firm* — Thompson Coburn LLP

(57) ABSTRACT

A personal alarm system including a sound-detecting transmitter and a pressure-detecting receiver capable of generating a local stimulus generated by the receiver and at the receiver's location once a signal indicative of a detected sound is transmitted from the transmitter to the receiver while the receiver is detecting whether or not pressure is present.

20 Claims, 19 Drawing Sheets

Figure 6A:
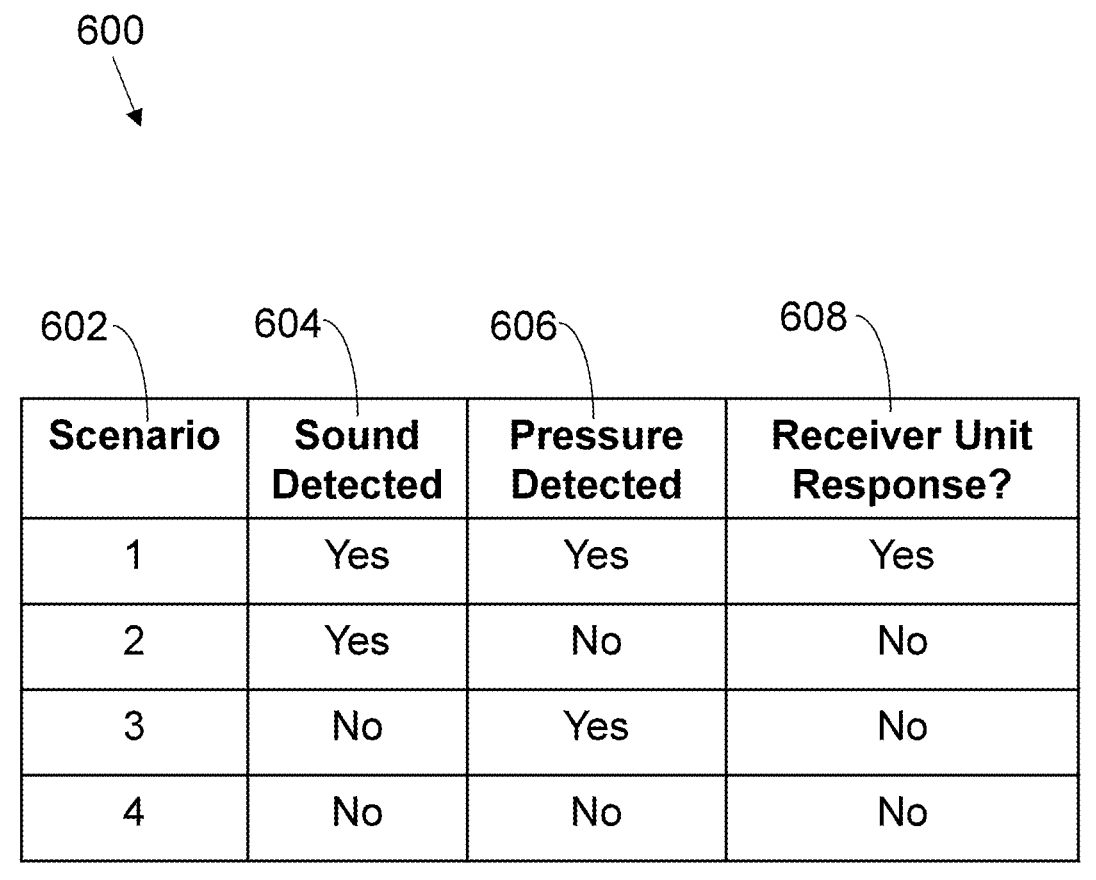

600

| Scenario | Sound Detected | Pressure Detected | Receiver Unit Response? |
|---|---|---|---|
| 1 | Yes | Yes | Yes |
| 2 | Yes | No | No |
| 3 | No | Yes | No |
| 4 | No | No | No |

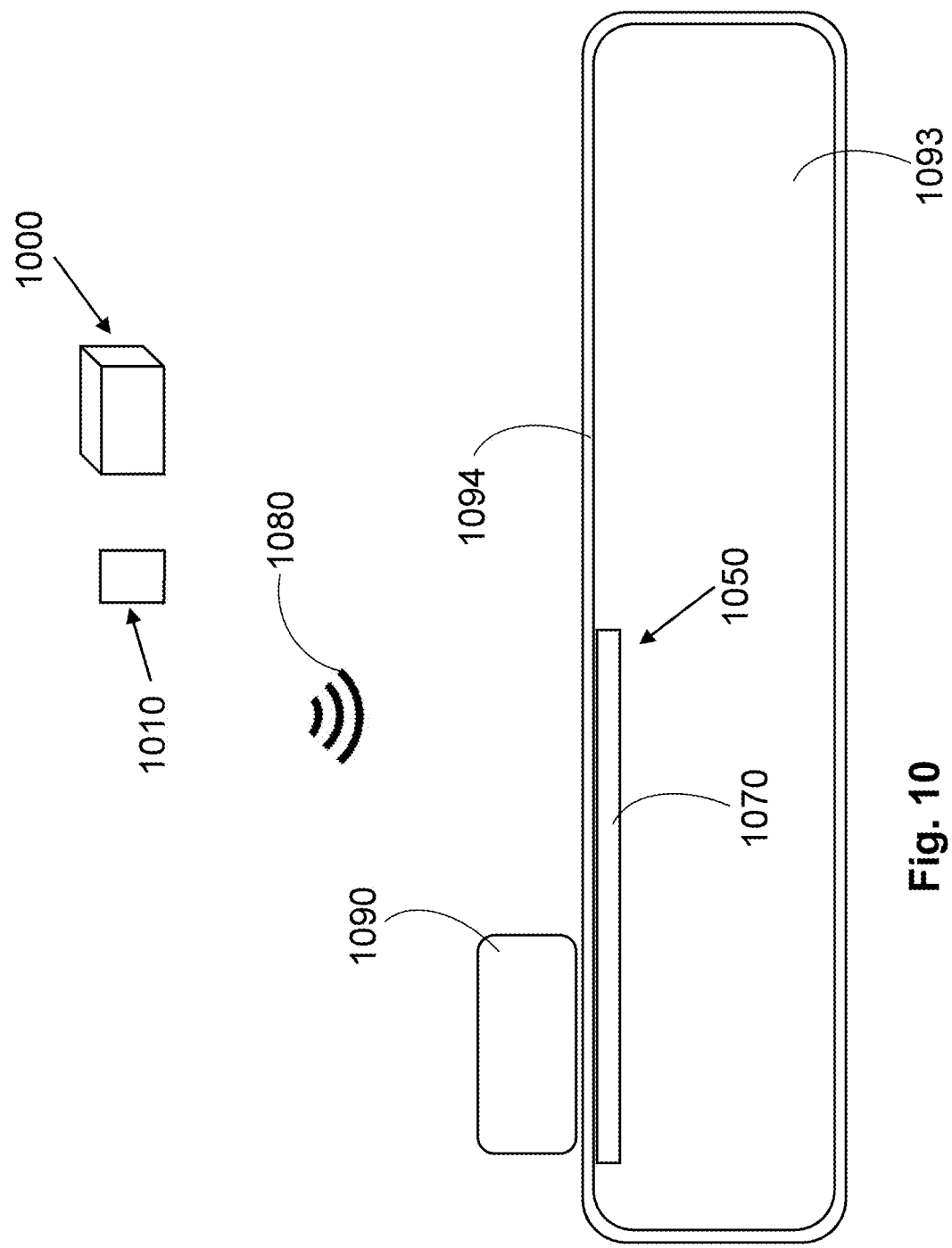

PERSONAL ALARM APPARATUS, SYSTEM, AND METHOD

INTRODUCTION

Personal alarms that aid a person in waking up conventionally take the form of a tabletop alarm clock, and, more recently, mobile or other smart devices such as cellular phones, tablets, and voice-controlled assistants that contain (alarm) clock features. However, even with an alarm sounding, some people still have difficulty waking up and/or turn off the alarm and fall back asleep. This may cause the person to be late to an event (e.g., meeting, school, work, etc.) or otherwise fail to wake up at the desired time.

In view of the above, there is a need for a personal alarm apparatus, system and method that provides for a personal alarm that can supplement and/or be redundant to a primary alarm, increasing the likelihood that the user awakens due to the personal alarm.

SUMMARY

This section provides a general summary of the disclosure, and is not a comprehensive disclosure of its full scope or all of its features.

The apparatus, system and method disclosed herein relate to a personal alarm device that is used in conjunction with bedding (e.g., a pillow/mattress, aka a sleeping aid) in order to more surely and effectively wake a user, while also thwarting the user's ability to disarm the alarm and fall back asleep.

In one embodiment, a personal alarm apparatus comprises: a transmitter configured for placement adjacent a sound source, the transmitter comprising at least one sound-detecting sensor and control circuitry configured to transmit a detected sound transmission; and a receiver configured for placement adjacent a sleeping aid to which a user will apply force to, the receiver comprising at least one force-detecting sensor, at least one stimulus-generator, and control circuitry; wherein upon detection of a sound from the sound source by the at least one sound-detecting sensor, the transmitter control circuitry transmits the detected sound transmission to the receiver; and when the receiver control circuitry (i) receives the detected sound transmission and (ii) detects applied force from at least one body part of the user on the sleeping aid via the at least one pressure-detecting sensor within a predetermined period of time, a local stimulus is generated by the at least one stimulus-generator adjacent the sleeping aid.

In this embodiment, the sleeping aid may be a pillow, or a mattress, and the sound source may be an alarm clock or a personal computing device capable of generating a sound. At least one of the transmitter and the receiver may be in operative communication with the personal computing device and may be configured to control an operational parameter of the personal computing device. The at least one force-detecting sensor may be selected from the group comprising: a pressure sensor, a position switch, at least one strip of conductive material, and a strain gauge. The receiver may comprise a substrate, and the at least one force-detecting sensor may be on or embedded, in whole or in part, within the substrate, wherein the substrate may comprise a pliable material configured to conform to a shape of the sleeping aid, and the local stimulus is selected from the group comprising: a vibration and an audible alert. The at least one force-detecting sensor may comprise a plurality of force-detecting sensors. The at least one body part is the user's head, and the applied force is a force applied from the user's head to the sleeping aid. The sleeping aid may be a pillow, the receiver may be under a surface the pillow, and the at least one force-detecting sensor comprises two conductive sheets that are configured to form a continuity path under applied force from the at least one body part of the user to another surface of the pillow opposite the surface the receiver is under. The sleeping aid may be a mattress and the receiver may be on a surface of the mattress such that the force applied by the at least one body part of the user is detected by the at least one force-detecting sensor of the receiver.

In another embodiment, a method for generating a personal alarm comprises: placing a transmitter adjacent a sound source, the transmitter comprising at least one sound-detecting sensor and control circuitry; placing a receiver adjacent a sleeping aid to which a user will apply force to, the receiver comprising at least one force-detecting sensor, at least one stimulus-generator, and control circuitry; detecting a sound from the sound source via the at least one sound-detecting sensor; via the transmitter control circuitry: (i) processing the detected sound, (ii) generating detected sound data, and (iii) transmitting, from the transmitter to the receiver, a detected sound transmission based on the generated detected sound data; via the receiver control circuitry: (i) receiving the transmitted detected sound transmission, (ii) processing data associated with the transmitted detected sound transmission, and (iii) generating a receiver-side sound indicator; detecting, via the at least one force-detecting sensor, a force applied to the sleeping aid by at least one body part of the user, and, via the receiver control circuitry: (i) processing the detected force, and (ii) generating a receiver-side force indicator; and when the receiver-side sound indicator and the receiver-side force indicator occur within a predetermined time period of one another, generating, via the at least one stimulus-generator, a local stimulus adjacent the sleeping aid.

In this embodiment, the receiver may be placed on, under, or inside the sleeping aid, and the sleeping aid may be selected from the group comprising: a pillow and a mattress. The sound source may be selected from the group comprising: an alarm clock and a personal computing device capable of generating a sound. This embodiment may further comprise transmitting an operational parameter for the personal computing device from the receiver to the personal computing device, and controlling the personal computing device to operate according to the operational parameter. The at least one force-detecting sensor may be selected from the group comprising: (i) a pressure sensor, (ii) a position switch, (iii) at least one strip of conductive material, and (iv) a strain gauge, and the local stimulus is selected from the group comprising: a vibration and an audible alert.

Yet another embodiment comprises an article of manufacture for a personal alarm system configured to be used adjacent a sleeping aid on which a user will apply force to, the article of manufacture comprising: a first non-transitory computer-readable recording medium of a transmitter having stored thereon first machine-readable code, wherein the first machine-readable code defines operations to be performed by a first processor of the transmitter to cause the first processor to: detect a sound from a sound source adjacent the transmitter via at least one sound-detecting sensor of the transmitter; process the detected sound; generate detected sound data; transmit, from the transmitter to a receiver, a detected sound transmission based on the generated detected sound data; a second non-transitory computer-readable recording medium of a receiver having stored thereon second machine-readable code, wherein the second machine-readable code defines operations to be performed by a second processor of the receiver to cause the second processor to: receive the transmitted detected sound transmission; process data associated with the transmitted detected sound transmission; generate a receiver-side sound indicator; detect, via at least one force-detecting sensor of the receiver, a force applied to the sleeping aid by at least one body part of the user; process data based on the detected force; and generate a receiver-side force indicator; wherein when the receiver-side sound indicator and the receiver-side force indicator are each generated within a predetermined time period of one another, generate, via a stimulus-generator of the receiver, a local stimulus adjacent the sleeping aid.

In this embodiment, the local stimulus may be at least one of a vibration and an audible alert.

These are merely some of the innumerable aspects of various embodiments and should not be deemed an all-inclusive listing of the innumerable aspects associated with the various embodiments. These and other aspects will become apparent to those skilled in the art in light of the following disclosure and accompanying drawings. The description and specific examples in this summary are intended for purposes of illustration only and are not intended to limit the scope of the present disclosure.

BRIEF DESCRIPTION OF THE DRAWINGS

The accompanying drawings, which are incorporated in and form a part of the specification, illustrate the embodiments of the present disclosure and together with the description, serve to explain the principles of the disclosure.

FIG. 6A illustrates a table of usage scenarios according to the various embodiments.

FIG. 10 illustrates an alternative embodiment of the personal alarm system usable with a mattress.

DETAILED DESCRIPTION

Figure 1:
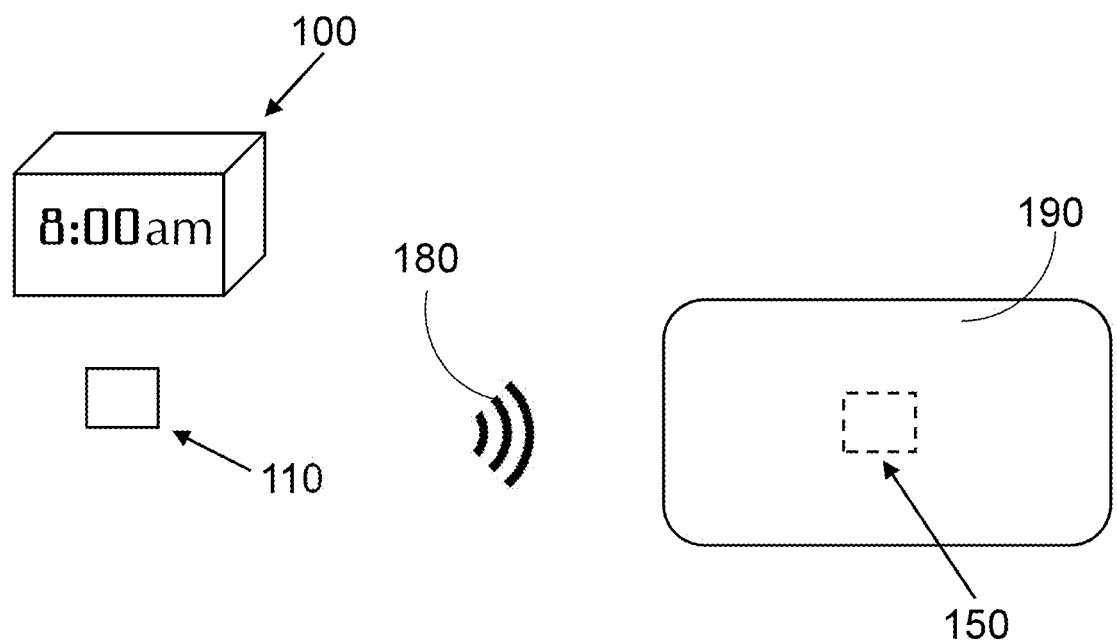
FIG. 1 illustrates an embodiment of a personal alarm system with a transmitter module and a receiver module.

FIG. 1 illustrates one embodiment of a personal alarm system, used with a sound source and a pillow. The sound source may be an alarm device 100 set to a particular time to generate an audible alarm to wake a user near the alarm device. The alarm device 100 can be a table-top clock or, for example, another device with alarm clock functionality, such as a mobile phone, tablet, smart voice-assistant device, etc. (aka a personal computing device). Module/unit 110 is an audible detection module/unit that also serves as a transmitter module/unit in operative communication (such as via wireless communication 180) with a receiver module/unit 150. The wireless communication 180 may be two-way or one-way communication between the modules/units 110 and 150. In one embodiment, units 110 and 150 comprise housings containing corresponding electronics therein, and positioned near the intended item (e.g., unit 110 is placed near a sound source such as alarm 100, and unit 150 is used with a pillow). For example, the receiver unit 150 is used in conjunction with a pillow 190 (e.g., sleeping aid), such as inside or under the pillow 190, and may produce its own alert in the form of vibration or sound or any other stimulus helpful in waking a sleeping user. Thus, receiver unit 150 may be a receiver/stimulus unit 150, such as a receiver/vibrating unit, that can both receive transmissions from unit 110, and depending on the scenario, vibrate or otherwise use a stimulus to assist in waking up a user. For example, when unit 150 is a receiver/vibrating unit used inside of a pillow, the receiver/vibrating unit may cause vibrations to occur within the pillow to assist in waking a user. Vibrations are just one option, and the unit 150 may additionally or alternatively be configured with its own sound source, so that a wake-up sound emanates from the pillow, and would thus be more likely to wake a user than an alarm device that may be at a farther distance (and thus has a fainter sound). Other embodiments of unit 150 may comprise both vibration and sound alerting functionality. Element 110 may be referred to as a unit/module/device, and/or a transmitter, detector, and any reasonable usage of such, alone or in combination (e.g., detection module/unit, detector module/unit, transmitter/detector, etc.), since it both detects sounds from a sound source and transmits a signal to the receiver/stimulus unit 150. Element 150 may be referred to as a unit/module/device, and/or a receiver, stimulator, vibrator, etc., and any reasonable usage of such alone or in combination (e.g., vibrating module, stimulating module, receiver, etc.) since it both receives signals from the transmitter 110 and generates a stimulus which may be in the form of vibration, audible, etc. These units/modules/devices contain the necessary structure (e.g., PCB, electronics, etc.) and software/programming to perform as described herein. The units 110 and 150 may be configured to be battery powered (e.g., rechargeable (lithium ion or otherwise) batteries, or one-time use batteries), but wired/mains power embodiments are also envisioned. For example the units may have a power port and power adapter for recharging batteries therein or otherwise providing power to the units.

Figure 2A:
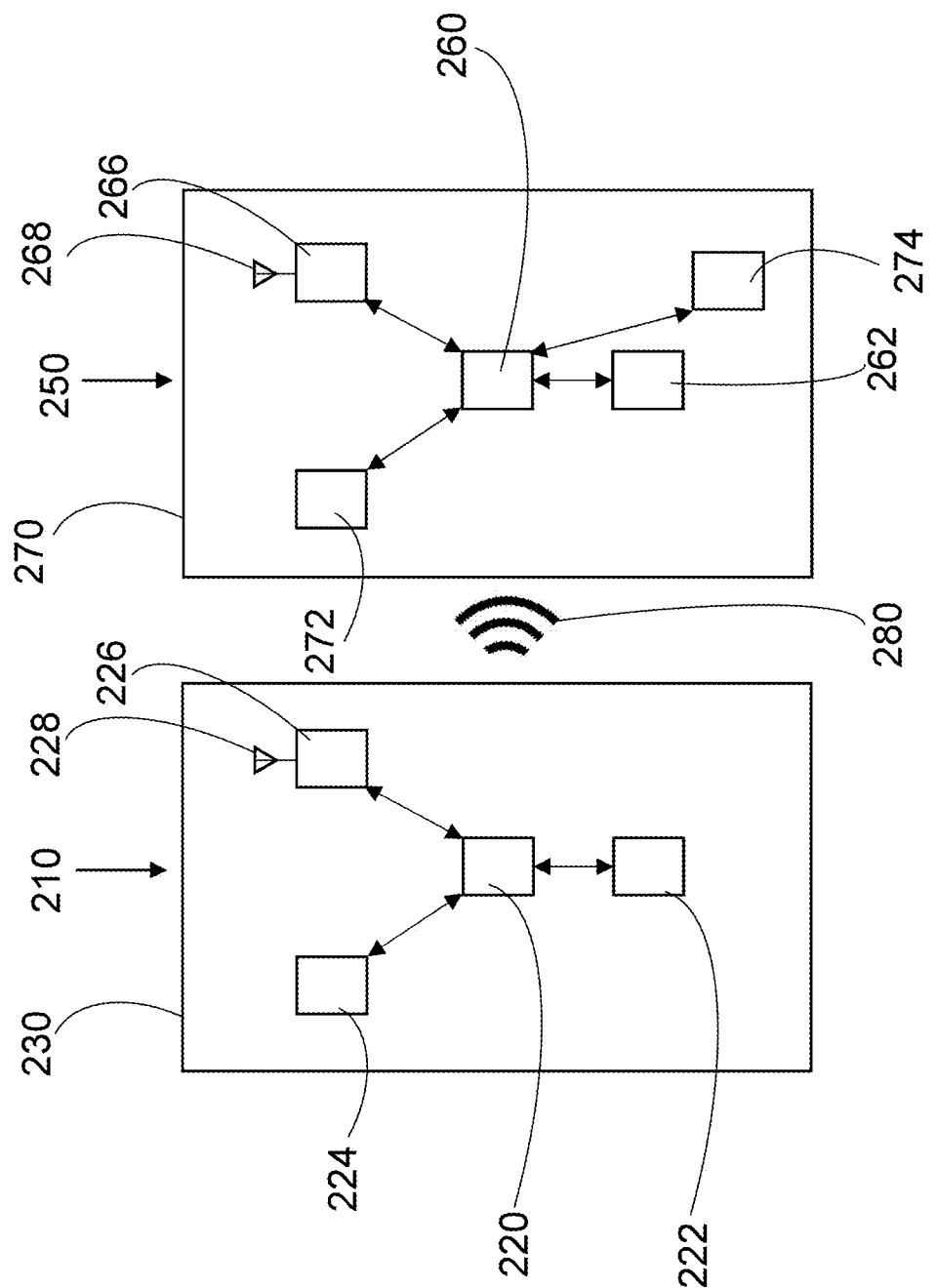
FIG. 2A illustrates an embodiment of a circuit for the transmitter module and receiver module according to FIG. 1.

FIG. 2A illustrates a schematic of (electronic) components of the detection/transmitter unit 210 and the receiver unit 250, where like elements are labelled in similar fashion as in other figures (e.g., detection/transmitter unit 210 relative to element 110 in FIG. 1, receiver unit 250 relative to element 150 in FIG. 1, etc.). Each of unit 210 and 250 may be configured with a housing that contains the necessary electronics, etc. therein. The detection/transmitter unit 210 may also and/or alternatively be referred to as an alarm unit/alarm clock module, and comprises a main processor 220, a memory 222, at least one sensor 224, a transceiver circuit 226 (which may include an antenna 228 for wireless communication, for example, with module 250, such as wireless communication 280), and a housing 230 containing (electronic/electrical) components 220 through 228 therein (collectively referred to as control circuitry). While generally shown as individual components in the figures, there may be a plurality of each type of component. Also, code/software necessary for implementing the functions of the module 210 may be resident in/on any combination of the processor 220 and/or memory 222, alone or in combination, or in other elements not expressly shown such as other buffers, registers, etc. Any of the various components (e.g., 220, 222 . . . ) of the module 210 may be in one- or two-way operative communication with one another via a data bus or other data communication mechanism, and located within housing 230 of the unit 210. For example, the components 220 to 228 may be located on a printed circuit board or other circuit configuration (not shown) located inside housing 230 and electrically connected to one another via conductive traces and/or other conductive structures (e.g., vias, lands, pads) of the circuit board, or used in a flex-circuit/ribbon configuration, etc.

The sensor 224 may be a sound sensor, such as microphone or other sound-sensing device, and may, via hardware and/or software, be configured to react to one type of sound over another. For example, the sound sensor 224 may be configured to primarily react to standard alarm clock sound frequencies, tones, patterns, certain songs or other melodies, etc. Thus, the sensor may be tuned or otherwise configured (e.g., via (band-pass) filtering) to be responsive/reactive to certain sounds (and not to other sounds)). In the case of using a smart phone or similar device with alarm capabilities, the alarm clock module 210 via sensor 224 can also be configured to recognize the standard alarm sounds resident in the device's operating system (e.g., the built-in alarm tones that are natively included with, for example, a smart phone, as part of the smart phone operating system). In other words, the module 220 may be specifically tailored to recognize sounds that are alarm sounds. This can be done with by way of frequency analysis or other analysis (e.g., tone, sound pattern recognition, etc.). The module 220 may then also be configured to not react to or otherwise disregard sounds that would not fall within the range of expected alarm-type sounds. This allows for the module 220 to avoid false positive triggers by other ambient/environmental sounds not intended to cause the module 220 associated with the pillow to react. Moreover, the sensor 224 comprise a plurality of sound sensors, for example to allow for multi-directional sound sensing.

The receiver unit 250 (which may also be referred to as a vibrating unit and/or receiving/vibrating unit and/or pressure unit) may comprise a main processor 260, a memory 262, a transceiver circuit 266 (which may include an antenna 268 for wireless communications, for example, with unit 210), and at least one sensor 272, each of components 260, 262, 266 and 268 (collectively referred to as control circuitry) may be located within a housing 270, where housing 270 may also include a plurality of sensors 272 and a stimulus generator/component 274 therein or otherwise situated with respect to the housing. While generally shown as individual components in the figures, there may be a plurality of each type of component. Also, code/software necessary for implementing the functions of the module 250 may be resident in/on any combination of the processor 260 and/or memory 262, alone or in combination, or in other elements not expressly shown such as other buffers, registers, etc. For example, code necessary for implementing the functions of the unit 250 may be resident in/on any combination of the processor 260 and/or memory 262, alone or in combination. Any of the various components (e.g., 260, 262 . . . ) of the unit 250 may be in one- or two-way operative communication with one another via a data bus or other data communication mechanism, and located within housing 270 of the unit 250. For example, the components 260, 262, 266, 268, 272, and 274 may be located on a printed circuit board or other circuit configuration (not shown) located inside housing 270 and electrically connected to one another via conductive traces and/or other conductive structures (e.g., via, lands) of the circuit board, etc. . . . . Stimulus element 274 may comprise a vibrating element (e.g., similar to those present in smartphones and/or video game controllers), speaker, and/or other device capable of providing a stimulus sufficient to wake a user. Since unit 250 is configured to be located in or on/under a pillow such as element 190 in FIG. 1, the housing and circuit board may be thin profile and/or flexible, and may have a length/width similar to size proportions of the pillow. For example, the circuit board may be configured as a flex circuit to provide for a degree of flexibility while maintaining the necessary functionality. The housing may comprise a plastic of a hardness used in conventional electronics product housings, or may comprise a softer plastic and/or rubber or other pliable material (e.g., silicone) so as to facilitate usage in a sleeping environment (e.g., so as to not be noticeable by the user and/or disruptive to the user's sleep even when the receiver is located in/on the pillow on which the user is sleeping on). For example, a housing made of a softer and/or pliant material may be better able to not disrupt a user while sleeping. In other words, a goal of the design of unit 250 is so that it can be used in conjunction with a pillow without be noticeable to the user and/or disrupting their sleep when using the pillow. While the receiver is primarily intended to have the stimulus generator 274 so as to provide local stimuli to the user at the pillow location, it may also be desirable for the transmitter to have a similar stimulus generating component, and an embodiment of the transmitter having such functionality is encompassed herein.

The sensor 272 may comprise a pressure sensor, and be configured, for example, to detect pressure/force from a user's head on the pillow. For example, when the unit 250 is inside the pillow and a user's head is on the pillow, the pressure sensor is able to detect the presence of the user by correlating the sensed pressure to the presence of the user. Similarly, the pressure sensor can detect absence of the user (e.g., absence of the user's head on the pillow) if the sensed pressure is determined to not be indicative of the user's head being present. This is but one potential usage of the pillow with unit 250 included therein/thereon. For example, a user could instead place the pillow under their back or between their legs. The sensor 272 may comprise a plurality of sensors located in/on various sections of the pillow. Moreover, the sensors 272 may be configured to have an operative sensing portion face in opposite or a variety of directions, so as to be able to detect pressure in a variety of scenarios, such as if the user turns the pillow over and/or using the pillow for support/comfort of body parts other than the head.

The vibrating element 274 may comprise a motor or other device capable of generating vibration sufficient to be felt by a user. For example, the motor may be configured to include an uneven (e.g., counter) weight (aka eccentric rotating mass) about a central rod/axis of the motor, such that when the motor is excited and the rod spins, the unevenness of the weight causes vibration that can be transmitted/propagated via the housing of the unit 250. Alternatively, a linear resonant actuator (e.g., that uses a voice coil) or similar device can be used to provide the vibration. In addition to or in the alternative, element 274 may include a speaker capable of generating sound. The local sound generated at the user's pillow would have a greater tendency to wake up the user than a far away alarm clock. Thus, element 274 can use a combination of vibration/sound at/in the pillow to wake the user.

Figure 2B:
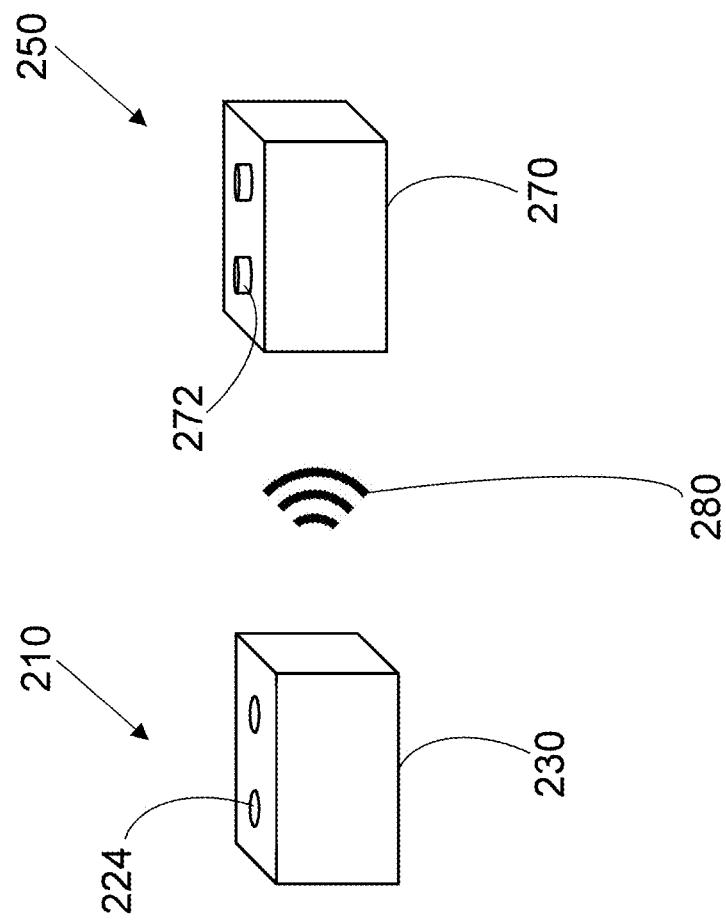
FIG. 2B illustrates another embodiment of a personal alarm system with a transmitter module and a receiver module.

FIG. 2B illustrates an embodiment of the units 210 and 250, generally depicting units 210 and 250 and their relation to one another. Each unit 210 and 250 may be configured as a housing containing the necessary electronics, etc. therein. The shape/type/form of the housing is not limited and may be selected so as to best accommodate the typical operational environment of each unit (e.g., the housing may be a generally square/rectangular plastic housing, or a flexible substrate or other configuration to fit the needs of each unit). At least one sound sensor 224 of alarm unit 210 may be positioned in housing 230 so as to be able to readily detect desired environmental noise, such as an audible alarm from an alarm clock or smart device such as a cell phone, etc. The receiver/pressure detector unit 250 may comprise at least one pressure sensor 272 extending/protruding from housing 270 so that the sensor(s) is/are capable of being depressed (e.g., actuated) by a user's head while the user is using the pillow. The sensor(s) may be configured in an array and electrically connected together in such a manner that a "true"/positive/HIGH pressure indication of any one sensor results in a "true" value for the overall pressure detection state regardless of if other sensors in the array are not actuated (e.g., a user only actuates a sub-set of the sensors while using the pillow). Such "true" value being indicative of pressure being sensed and hence the assumption that a user is sleeping on the pillow. On the other hand a "false"/negative/LOW pressure indication from the sensor(s) is indicative of no user sleeping on the pillow. But this is not limiting—the sensors can arranged in any parallel and/or series configuration as desired to result in desired pressure sensing. For example, the sensors of the overall array may be zoned off into various detection zones, and such individual zones may or may not be (electrically) tied in with adjacent zones. Thus, there may be independent sensing zones (e.g., different portions of the pillow), or a combined detecting zone(s) for the entire pillow. For example, it may be the case where a determination of a user being on the pillow is made once there is an activated sensor in two different areas, thus lending confidence that the "true" state was not erroneously arrived at. In the case where multiple zones are used, the sensors in one zone may be selected and/or configured to be of a certain sensitivity, while sensors in a different zone may be selected or configured differently. For example, sensors in the housing that will tend to be located in the middle portion of the pillow may be configured to be of one sensing sensitivity, whereas sensors in another part of the housing tending to be on outer edges of the pillow may be configured to have a different sensing sensitivity. For example, sensors on the outside may not face as much direct force, and thus may be configured to be more easily triggered (e.g., triggered by a force less than that which is applied via a user's head). This can also account for the likelihood that a user's head will tend to be in the middle of the pillow more than at the edges of the pillow, but still account for if the user's head is on an edge of the pillow. Thus, the sensors can be "tuned" (either physically or via software that processes the output of the sensors) to have a sensing sensitivity that accounts for the sensor location(s) relative to the pillow and the tendency of a user's head to be present at certain portions of the pillow more/less than other portions. Thus, any of two sensors may be tuned to be more or less sensitive/responsive than the other. Moreover, the overall "true" or "false" pressure detection state may be configured to require the state of any number of sensors to trigger the designation of the device being in a "true" or "false" state. For example, the "true" state (representing a user on the pillow) may require the state of at least one sensor, or more than one sensor, to be depressed/actuated to result in the system being deemed to be in the "true" state. And the "false" state (indicating no user on the pillow) may require the state of at least one sensor, or more than one sensor, not being actuated/depressed to result in the system being deemed to be in the "false" state.

Figure 3A:
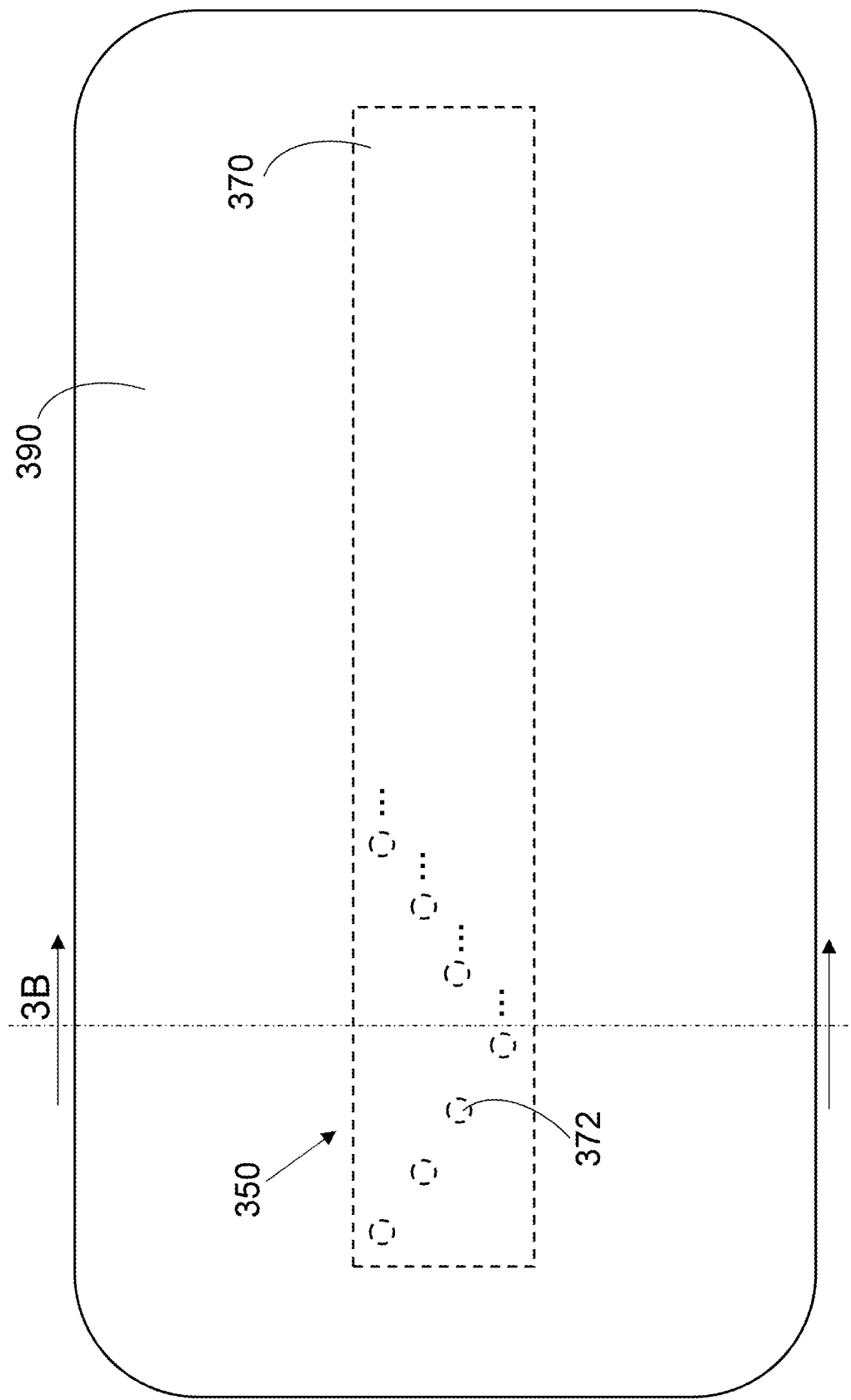
FIG. 3A illustrates an embodiment of a receiver module with pressure sensors.

FIG. 3A illustrates an alternative embodiment of a receiver/vibrating unit 350 inside of pillow 390. The unit 350 may comprise an elongate housing 370, which may span a majority portion of the length of the pillow, although such length is not limiting and other lengths may be used. The width of 350 may also be set as desired to approximate all or portions of the width of the pillow. The housing 370 may, in full or in part, comprise a pliable material that is capable of flexing under pressure, and contain therein circuit components including a main processor 360, a memory 362, a sensor 364, a receive circuit 366 (which may include an antenna 368) (e.g., consistent with the like elements in FIG. 2). Moreover, the housing may or may not have walls. For example, the housing may be a sheet of flexible/pliant material such as silicone that can form around the shape of the pillow, with sensors and necessary wiring embedded or otherwise fixed within the sheet. For example, a silicone sheet similar to a silicone baking sheet may serve as a substrate for placement of the electronics (sensors, etc.) throughout the substrate. Such a substrate/sheet configuration lending to the portability of the device—for example, packing the sheet flat in a suitcase amongst/on/under layers of clothes or the ability to roll up the sheet for transport, while also being able to form-fit to the contour(s) of the surrounding environment (e.g., the inside of a pillow, or the contour of an outer surface of the pillow. A plurality of pressure sensors 372 may be distributed in the housing 370, for example to face opposite directions (e.g., in case a user should flip the pillow over and/or to generally provide redundancy in the ability to detect downward pressure on the pillow, indicative of a user's head being on the pillow).

Figure 3B:
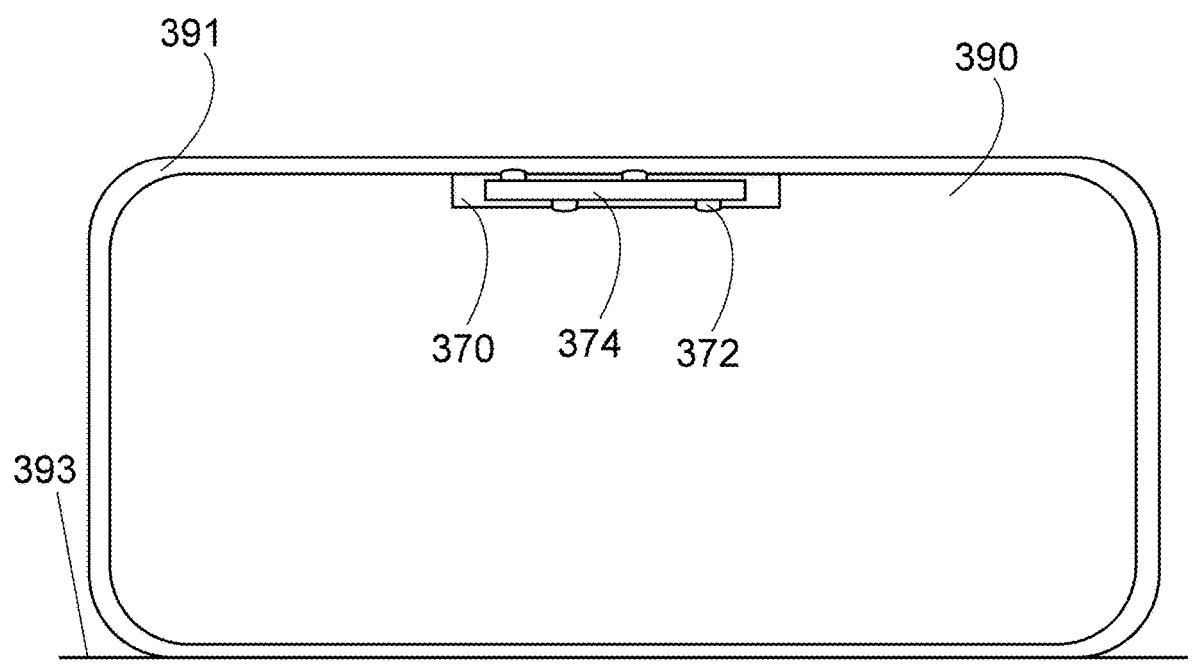
FIG. 3B illustrates a cross-sectional view of the receiver module according to FIG. 3A.

FIG. 3B represents a cross-sectional view of FIG. 3A, illustrating a circuit member 374 of unit 350 inside of housing 370 of unit 350, with the addition of pillow case 391 and mattress 393 being visible, where pillow 390 is encased by case 391 and on a surface of mattress 393. One portion of the sensors 372 may face an upward direction toward a surface of the pillow where the user will place their head, whereas another portion of sensors 372 may face the opposite direction relative to the upward-facing sensors 372 (e.g., the downward-facing sensors may face a surface of the bed/mattress). The sensors being operatively connected via a circuit member (e.g., circuit board, flex-circuit, wiring, etc., not shown) in housing 370 as necessary for desired operation. The circuit member 374 may be configured as a circuit board or as a flex circuit with the plurality of pressure sensors 372 extending therefrom in such a manner that the sensors pass through an orifice of the housing 370 such that an active (e.g., sensing) end of the sensors is exposed, thereby improving the ability of the sensors to sense pressure (e.g., in the form of pressure generated by way of a user's resting on the pillow). Or the circuit member 374 may comprise a plurality of traces/wires connecting the various sensors to one another within housing 370. While the housing 370 may be a multi-walled box, the housing 370 may alternatively be a substrate as described herein, such as a silicone sheet/substrate. As shown, the sensors 372 may be located on opposite sides of the circuit member 374, and as discussed herein. While FIG. 3B shows the receiver being located under pillow case 391 and on a top portion of pillow 390, this is but one envisioned location for unit 350 relative to the pillow/pillow case. For example, the location in FIG. 3B may be preferred when the personal alarm system is a retro-fit item for use with any standard pillow. But the personal alarm system may also be realized as an all-in-one solution sold with a pillow tailored to accommodate the personal alarm system. When the scenario of a pillow intentionally designed for use with the personal alarm system exists, the pillow may have as dedicated recess/pocket or other structural feature for receiving the personal alarm system (e.g., the personal alarm system may be insertable/removable from a dedicated location of the body of the pillow. For example, the personal alarm system may be centrally located in the middle portion of a pillow, or generally under the body of the pillow. The determination of the location of the personal alarm system may be made based on user preference, or recommended in user instructions that may come along with a commercial embodiment of the personal alarm system, or based on the situation (a retro-fit solution for use with any existing pillow, or a new pillow product having the device built-in). Again, a pillow product with this technology built-in may have a pre-formed slot or other opening/structure for housing the sensing device, accessible by the user. This would allow for removal of the device even when it was built-in to the pillow (e.g., removal for cleaning of the pillow, etc.). For example, the pillow may comprise a flap that covers the opening where the device is inserted/removed from. The pillow case (e.g., 391 or the like) may not always shown in the various embodiments and figures, but is envisioned to typically be present since a pillow is typically used with a pillow case.

Figure 3C:
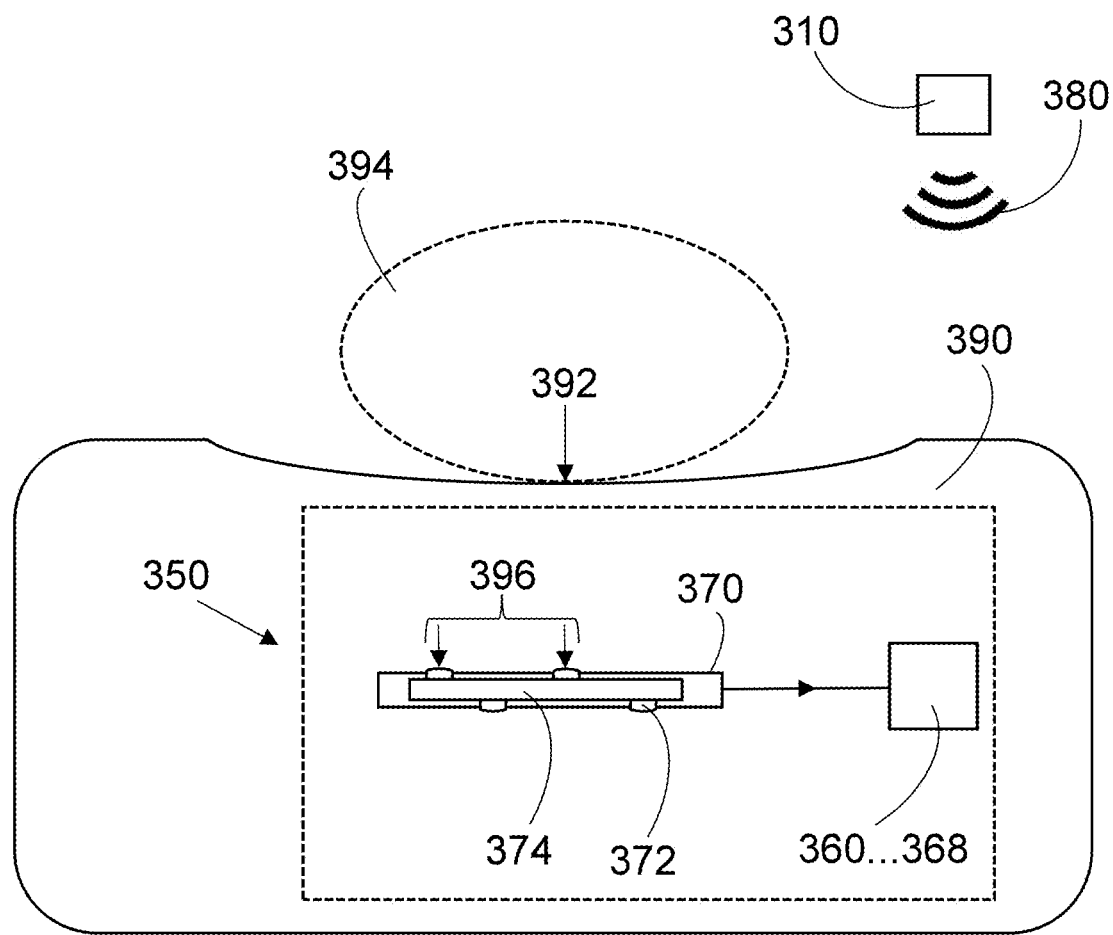
FIG. 3C illustrates a cross-sectional view of an actuated receiver module according to FIGS. 3A and 3B.

FIG. 3C illustrates a scenario where a user is sleeping on pillow 390, for example when unit 350 is used at the location of FIG. 3B or at some other location, so long as the sensors 372 are still able to be triggered by a downward force. Downward force (see arrow 392, e.g., from the sleeping user) is applied by the user's body (e.g., head 394) to the pillow 390 and may manifest as force (see arrows 396) transmitted to/detected by the sensors 372. For example, force 392 from head 394 may result in force 396 being applied to sensors 372, thereby triggering a pressure detection output from the actuated sensors. The receiver/vibrating unit 350 comprises housing 370 and (electronic) components 360, 362, 364, 366, 368 (e.g., 360 . . . 368) as described herein in connection with the like-labeled elements in other figures (e.g., FIG. 2), which may preferably be located within housing 370 (even though FIG. 3C depicts components 360 . . . 368 as being outside of housing 370). The location of electronics 360 . . . 368 is not limited to that which is shown in FIG. 3C-components 360 . . . 368 may be located inside or outside of housing 370 so long as they remain in operative communication with the sensors. If located inside housing 370, the portion of 370 where components 360 . . . 368 are located may not be a pliable portion (e.g., may be hard/rigid), so as to prevent applied forces from damaging or otherwise interfering with the operation of components 360 . . . 368. Or housing 370 may be the substrate configuration discussed herein. Components 360 . . . 368 may be located on a common circuit board or flex circuit (not shown) or otherwise operatively connected (e.g., wired) together, for example. A pressure detection signal from one or more sensors 372 may be output to components 360 . . . 368 for processing. Consistent with FIGS. 1 and 2 and the corresponding disclosures for such, units 310 and 350 are in wireless communication (380) with each other, either one-way (e.g., from 310 to 350, or vice versa), or two-way (e.g., two-way communication between 310 and 350) communication.

Figure 3D:
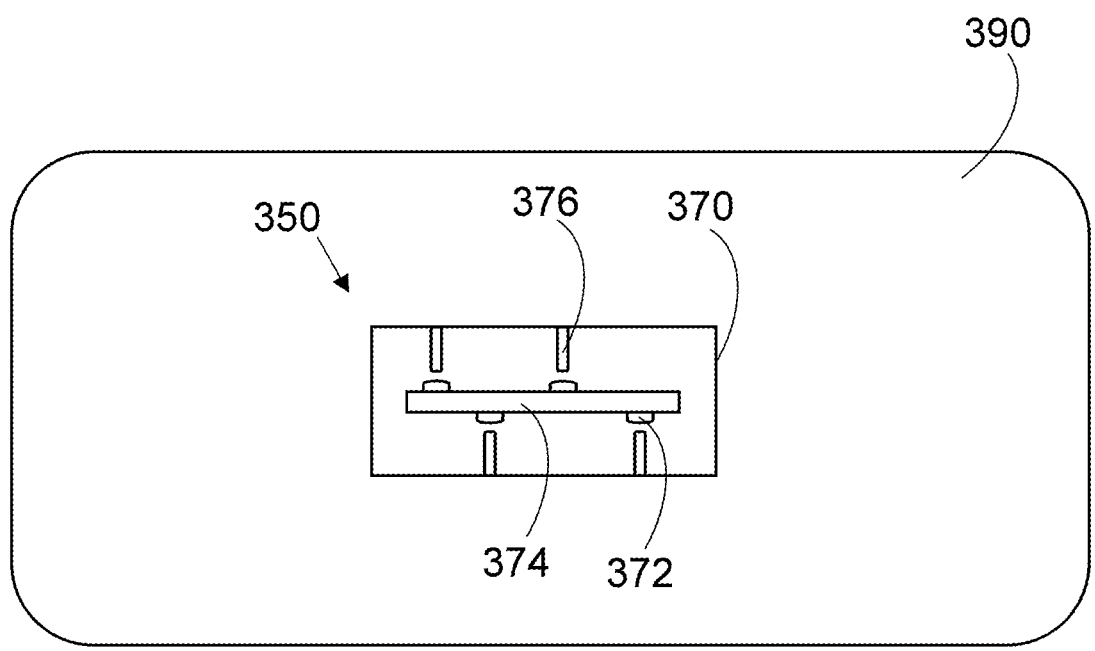
FIG. 3D illustrates a cross-sectional view of another embodiment of a receiver module with sensors and pushing members.
Figure 3E:
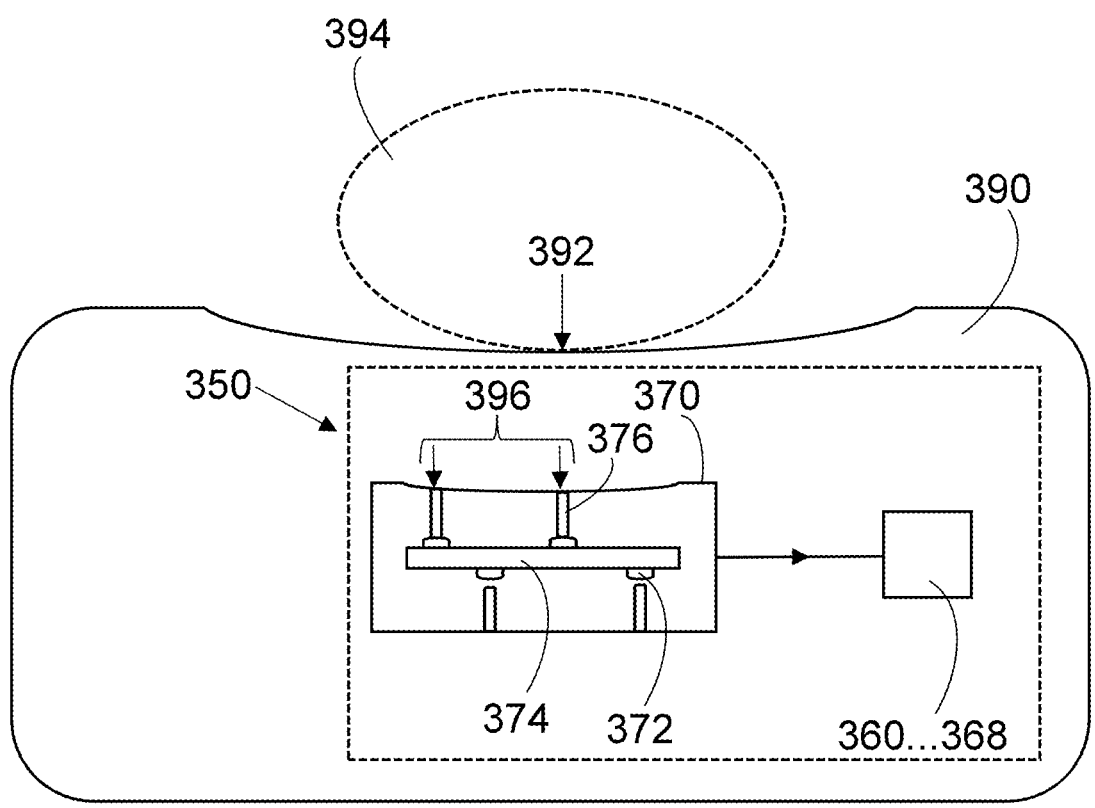
FIG. 3E illustrates a cross-sectional view of an actuated receiver module according to FIG. 3D.

FIGS. 3D and 3E illustrate a cross-sectional view of an alternative embodiment where the housing 370 is a multi-walled housing, and certain inner wall portions of the housing 370 may be configured with pushing members (e.g., prongs/bosses) 376 located opposite to a corresponding sensor and that interact with the sensors 372 to activate/deactivate the corresponding sensor. In this embodiment, the unit may be centrally located at a middle of the pillow in a commercial embodiment of the personal alarm system, or, in a retro-fit scenario, the unit 350 may be located under the pillow case and on a top surface of the pillow closest to a user's head, or within the pillow case but under the pillow, adjacent a surface of a mattress on which the pillow is present and on which the user will sleep. The wall portions from which the bosses 376 extend may be a flexible/pliant material capable of flexing under pressure/weight. This flexible/pliant material may comprise the entirety of the material of the housing, or the housing may be a multi-material housing, where the housing, except for the portions from which the bosses, extend may be a more rigid material compared to the flexible/pliant material of the sections from which the bosses extend. Various plastics/rubber/silicone materials may be used as desired to tailor the structure/make-up of the housing. FIG. 3D shows a non-actuated state (e.g., where no pressure is applied to the pillow and likewise none to the housing 370). FIG. 3E shows an actuated state (where pressure is applied to the pillow and hence the housing, causing the housing to deflect and for the bosses 376 to interact with the sensors). Force 392 from head 394 is applied as force to housing 370 such that a portion of housing 370 is deformed/deflected and force 396 is applied to bosses 376 to actuate the corresponding sensor. Sensors 372 may be pressure sensors as in the embodiment of FIG. 3A, or may be simple push-button sensors/switches that are actuated when the bosses 376 actuated the push-button of sensor 372. For example, sensors 372 may comprise a normally open switch that closes upon a boss 376 touching the switch, and then re-opens when the boss is not touching the switch. The use of bosses may improve the sensing of a user's heard. But this is not limiting, and a mix-and-match of different sensors can be used (e.g., some pressure sensors, some push-button switches, etc.). Using different types of sensors/switches may allow for customized sensitivity of the device since the different sensors/switches may afford varying degrees of sensing. Components 360 . . . 368 may be inside housing 370 of unit 350, or outside, as desired, so long as operative connection/communication is maintained.

Figure 4A:
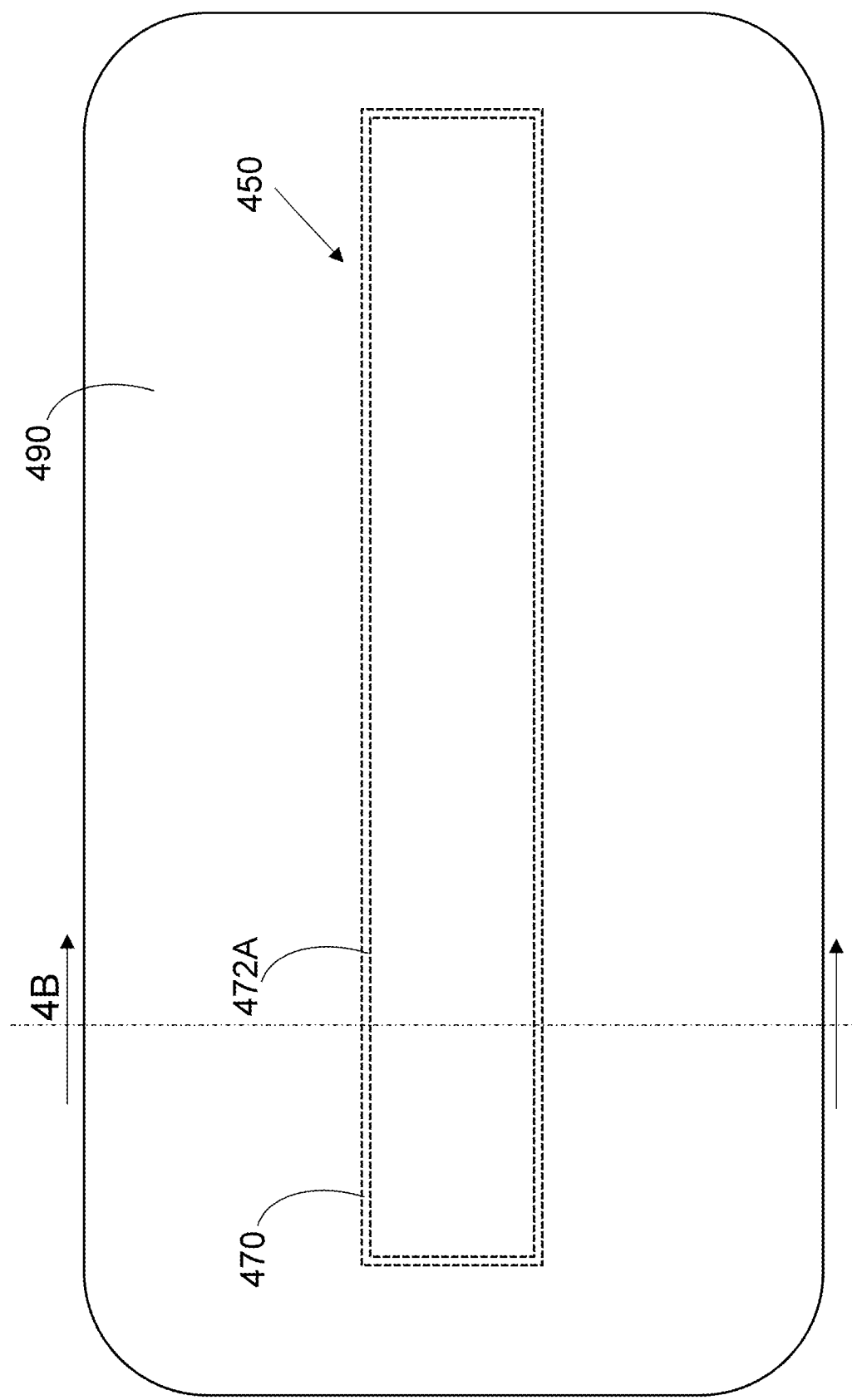
FIG. 4A illustrates another embodiment of a receiver module with a conductive pathway.

FIG. 4A illustrates an alternative embodiment of a receiver/vibrating unit 450 inside of pillow 490 that uses electrical continuity principles in lieu of or in addition to pressure sensors to detect the presence of downward weight/force applied to the pillow (e.g., the presence of a user's head, aka a person using the pillow for sleeping). The unit 450 may comprise (pliable) housing 470 with strips of conductive material (e.g., 472A, 472B (see FIG. 4B)) contained therein, such that the applied force brings the strips into contact with one another (e.g., by way of the weight of a user's head on the pillow), and create a continuity path that is indicative of the presence of a user's head. As described herein, the length/width of 470 may be sized as desired, and 470 may comprise a multi-walled housing, or a substrate.

Figure 4B:
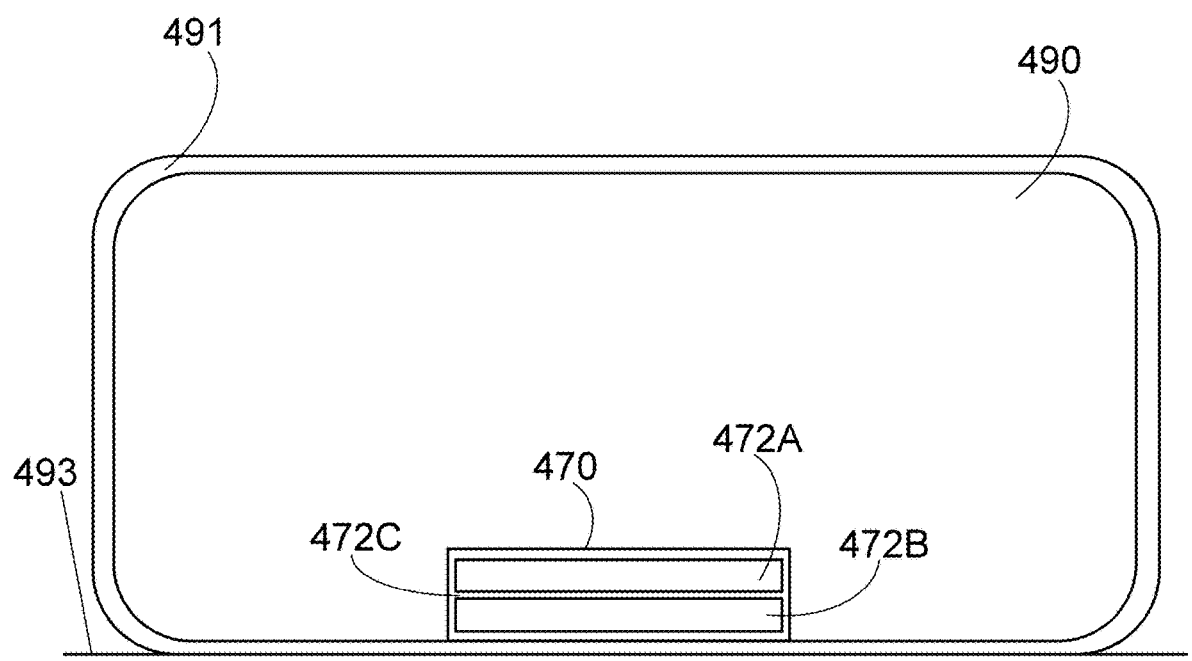
FIG. 4B illustrates a cross-sectional view of the receiver module according to FIG. 4A.

FIG. 4B illustrates a cross-sectional view of FIG. 4A but with pillow case 491 and mattress 493 visible, wherein the unit 450 may be located under the pillow body but within the pillow case, e.g., generally adjacent the mattress surface but opposite the top surface of the pillow body where the user's head will be. As described above, this location is not limiting and the unit 450 may be located at other portions of the pillow. Strips 472A/B, in a no applied pressure state, may exist in a normally-open state such that a gap 472C exists between strips 472A/B in the absence of downward pressure/force, where the strips do not make physical contact with one another inside of elongate housing 470 (which may span a majority portion of the length/width of the pillow). The gap 472C may be due to a biasing element (e.g., spring or the like) or other configuration that allows for the strips to be separate from one another absent applied pressure, but that where such biasing force will be overcome when sufficient pressure/force is present, such that the strips touch and create a continuity path. For example, the biasing mechanism that provides for gap 472C may be tuned for its bias/resiliency force to be overcome in response to a certain applied force/pressure, such as the weight of an average human head (e.g., child or adult, depending on the desired sensitivity). Alternatively, the strips 472A/B themselves can be shaped/formed in such a manner so as to have a certain self-bias/self-resiliency rating sufficient to withstand a certain weight, but to succumb to another weight. For example, the strips may be curved and/or of a certain thickness to be able to function as needed with respect to bias/resiliency for the desired operation. For example, in one embodiment, FIG. 4B represents a pliable substrate 470 with conductive strips 472A/B therein, where the strips, absent force, do not touch and do not have continuity, but in response to sufficient force, will touch and have continuity, where such touching/continuity results in a signal/path that is interpreted and processed by electronics and software to be indicative of a user's head being on the pillow.

Figure 4C:
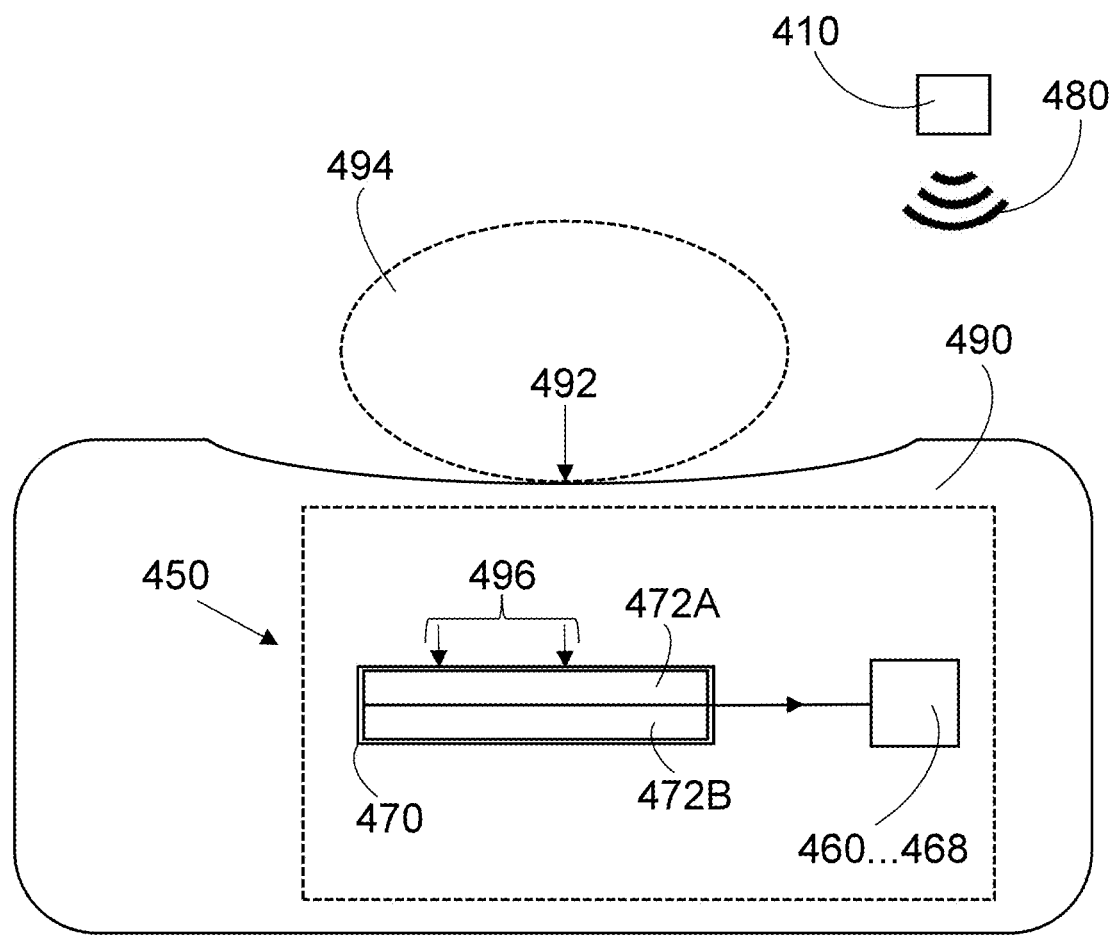
FIG. 4C illustrates a cross-sectional view of an actuated receiver module according to FIGS. 4A and 4B.

FIG. 4C illustrates a scenario where a user is sleeping on pillow 490. Downward force (see arrow 492) is applied by the user's body (e.g., head 494) to the pillow 490 and may manifest as force (see arrows 496) transmitted to the housing 470 and strip assembly (472A and 472B). For example, force 492 from head 494 may result in force 496 applied to strip 472A, thereby causing strip 472A to physically contact strip 472B, creating a continuity path between the strips. While FIG. 4C illustrates unit 450 being centrally located within the pillow, this is just for illustrative purposes for showing the force, and the unit 450 may be located as shown in FIG. 4B. The receiver/vibrating unit 450 comprises housing 470 and (electronic) components 460, 462, 464, 466, 468 (e.g., 460 . . . 468) as described herein in connection with the like-labeled elements of FIG. 2, which may preferably be located within housing 470 (even though FIG. 4C depicts components 460 . . . 468 as being outside of housing 470). This is not limiting and components 460 . . . 468 may be located as desired relative to housing 470. If located inside housing 470, the portion of 470 where components 460 . . . 468 are located may not be a pliable portion (e.g., may be hard/rigid), so as to prevent applied forces from damaging or otherwise interfering with the operation of components 460 . . . 468. Components 460 . . . 468 may be located on a common circuit board or flex circuit (not shown), for example. A pressure detection signal (e.g., continuity signal) from strips 472A/B may be output to components 460 . . . 468 for processing and setting the state of the device. Consistent with the embodiment in other figures and the corresponding disclosures for such, units 410 and 450 are in wireless communication (480) with each other, either one-way (e.g., from 410 to 450, or vice versa), or two-way (e.g., two-way communication between 410 and 450) communication. In operation, when the strips are in contact with one another as in FIG. 4C, this is interpreted as the user's head being on the pillow. Thus, the continuity signal that results from this scenario is used as the determination input to determine whether or not the unit 450 will generate local stimulus in/at the pillow upon receipt of the appropriate signal from the transmitter 410 (e.g., if transmitter 410 detects a sound from the sound source).

Figure 5:
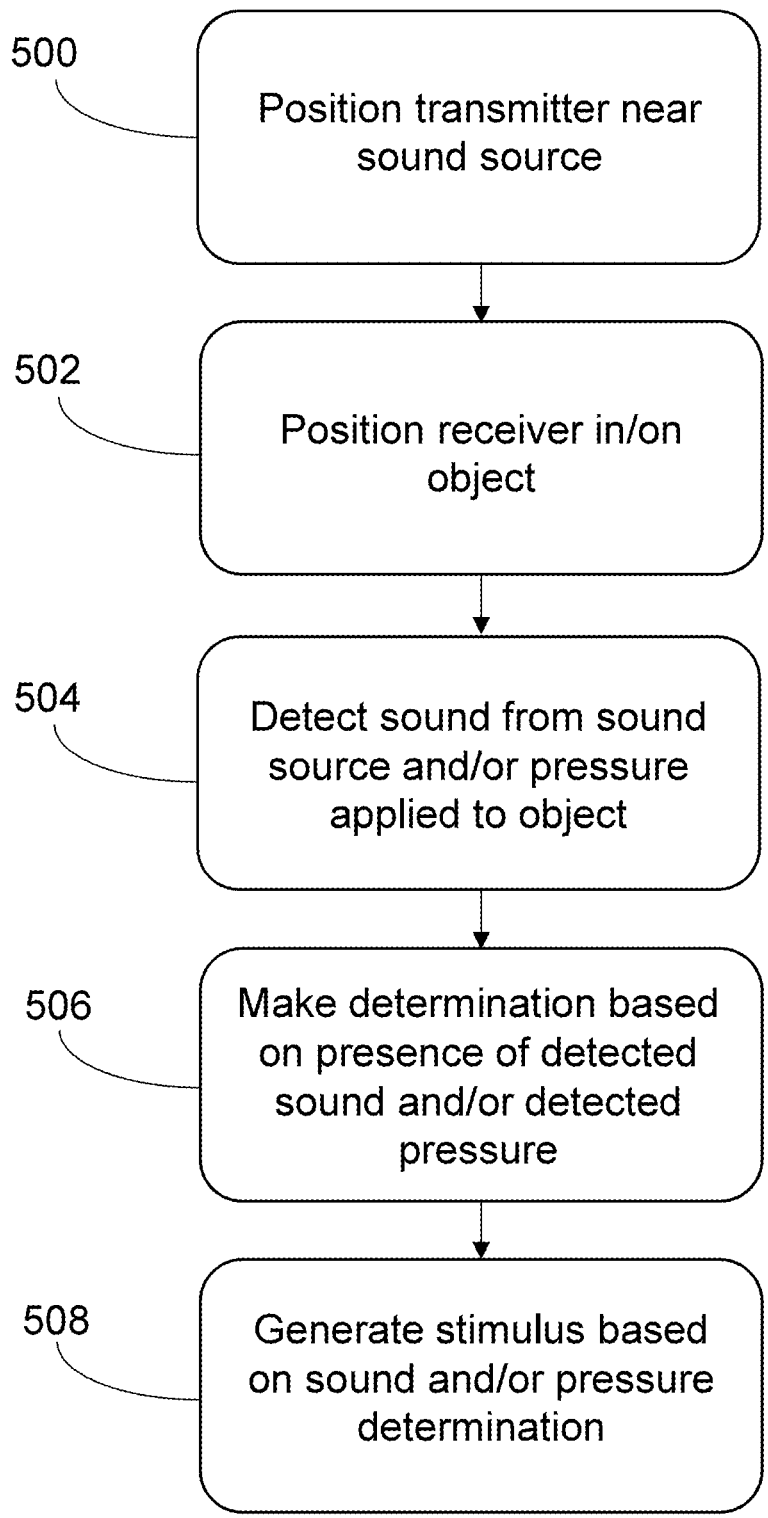
FIG. 5 illustrates steps of a method according to the various embodiments.

FIG. 5 illustrates an example of the general operation of a device as described herein. At step 500, a transmitter unit (such as 110 and the like) is placed near a sound source (such as 100 and the like), and at step 502 a receiver/stimulus unit (such as 150 and the like) is positioned in/on an object (such as 190 and the like). At step 504, the transmitter unit may detect sound from a sound source, and receiver/stimulus unit may detect force (pressure) applied to the object. At step 506, a determination is made, where such determination may include both whether or not a sound has been sensed by the transmitter unit (causing a signal to be sent from the transmitter unit to the receiver unit) and if such signal has been received by the receiver unit, and whether or not pressure is detected by the receiver unit at the object. At step 508, a local stimulus is generated at the object by the receiver/stimulus unit based on the determinations from step 506.

FIG. 6A illustrates a sample decision matrix such as the determination to be made in step 506 in FIG. 5. Table 600 shows a scenario 602, a sound state 604, a pressure detection state 606, and receiver/stimulus unit response 608. Each of Scenario 1-4 represents a different combination of events and a corresponding response. In each Scenario 1-4, the transmitter/sound detection unit (e.g., 110 and the like) is configured to detect a sound from a sound source (e.g., 100 and the like), and the receiver unit (e.g., 150 and the like) is configured to both detect a pressure/force and receive a signal indicative of a detected sound from the transmitter unit. For example, the transmitter/sound detection unit may be configured to detect an alarm from an alarm clock via a sound sensor of the transmitter unit. The receiver unit is configured to periodically make a determination as whether or not any pressure/force is detected. This periodicity may be based on the specifications of the components used or as set by the software, and may be on the order of milli seconds or up to a few seconds. The main concern is being able to always know the head-state of the head on the pillow (e.g., head on or off pillow), and frequent sampling of the sensor states can achieve such. If a sound is detected, a signal is transmitted from the transmitter unit to the receiver unit (e.g., 150 and the like) in the manner described/shown herein.

In Scenario 1 of FIG. 6A, if a sound (e.g., alarm) is detected by the transmitter unit, and the receiver unit (having had received the signal from the transmitter unit) detects the presence of pressure/force, then the receiver unit actuates and will cause a local stimulus at the pillow, e.g., the receiver/stimulus unit will vibrate and/or make its own sound (e.g., alarm) in the manner described herein, thereby improving the likelihood that the user sleeping on the pillow will wake up/react to the receiver unit (after having had ignored the sound from the alarm clock). This reflects a scenario in which it is assumed that the user is not responding to the alarm clock (e.g., was not awaken by the alarm clock (e.g., 100) or has otherwise disregarded the alarm clock (e.g., fallen back asleep, etc.)).

In Scenario 2 of FIG. 6A, if the transmitter unit detects a sound and accordingly transmits a signal to the receiver unit, but the receiver unit does not detect pressure, then the receiver unit will not generate a local stimulus at the pillow. This reflects a scenario in which it is assumed that the user is no longer on the pillow and has awaken.

In Scenario 3 of FIG. 6A, no sound is detected by the transmitter unit, and as such no signal is sent to the receiver unit. Even if pressure is being detected by the receiver unit (e.g., indicative of a user sleeping), the receiver unit will not actuate. This reflects a scenario in which the user is allowed to remain asleep because the alarm has yet to go off at the designated time.

In Scenario 4 of FIG. 6A, no sound is detected by the transmitter unit, and as such no signal is sent to the receiver unit, and no pressure is detected. This reflects a scenario in which the user is not on the pillow and the alarm has yet to go off at the designated time.

Figure 6B:
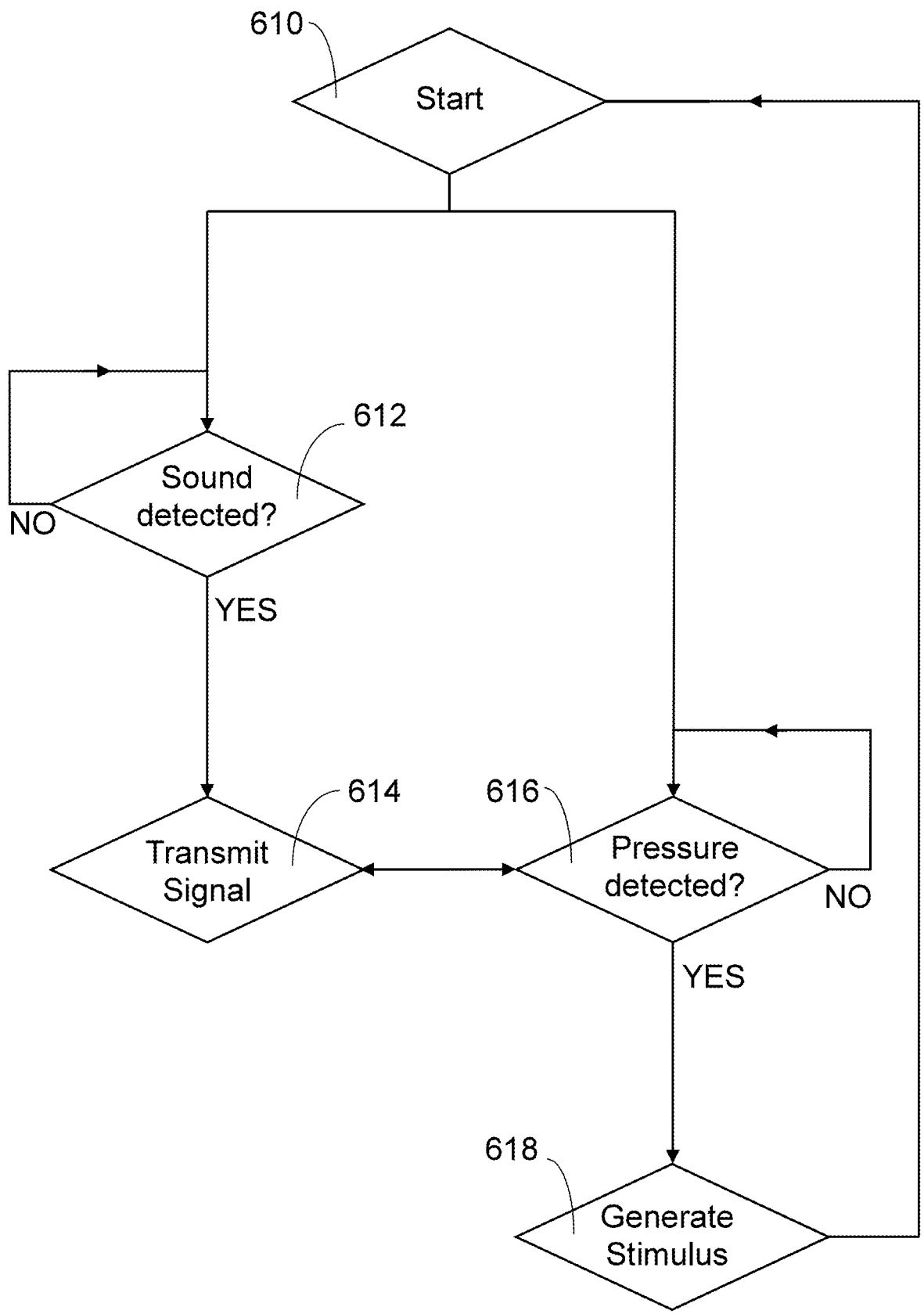
FIG. 6B illustrates an operational routine for operation of the personal alarm system according to the various embodiments.

FIG. 6B illustrates a routine that may be programmed into the device, consistent with the decision matrix of FIG. 6A. Step 610 is the start of the routine (e.g., upon powering on, the transmitter and receiver units enter into their respective sensing states). At step 612, a determination is made as to whether or not the sound sensor of the transmitter unit detected a sound from the sound source. If YES, the sound detection sub-routine proceeds to step 614 where a signal indicating that a sound has been detected is transmitted to the receiver unit. For example, a transmitter-side flag or other marker or interrupt may be set in the software, such flag/marker/interrupt (e.g., indicator) being indicative of a sound having been detected. If the result is NO, the sound detection sub-routine loops back to (continuously) check for a sound from the sound source. While the sub-routine for the transmitter is running, the sub-routines for the receiver unit are running, namely checking for if pressure is present and if a signal has been received from the transmitter unit. At step 616, a determination is made as to whether or not the sensors are detecting pressure. If YES, and a signal from the transmitter has been received within a certain period of time (e.g., last few seconds or less), then the sub-routine proceeds to step 618 where the receiver unit generates a local stimulus at the pillow. If the result is NO, the pressure detection sub-routine loops back to (continuously) check for pressure. For example, receiver-side flags or other marker or interrupt are set indicating a pressure was detected at the receiver, as well as a receiver-side flag/marker/interrupt (e.g., indicator) indicating receipt of a signal from the transmitter indicative of a sound detected at the transmitter side. These various flags/markers/interrupts may periodically be sampled to determine if any of the events for Scenarios 1-4 in FIG. 6A, in particular Scenario 1, has/have occurred. The only way that step 616 is reached is if there is both sound and pressure detection within the designated time frame. Once the stimulus has been generated at step 616 for a certain period of time, the stimulus generation will end and the routine restarts. For example, the stimulus may generate for a period up to ~300 seconds after the necessary conditions have been satisfied so as to increase the chances of waking the user by way of the local vibration/sound stimulus in/at the pillow under the user's head.

Figure 6C:
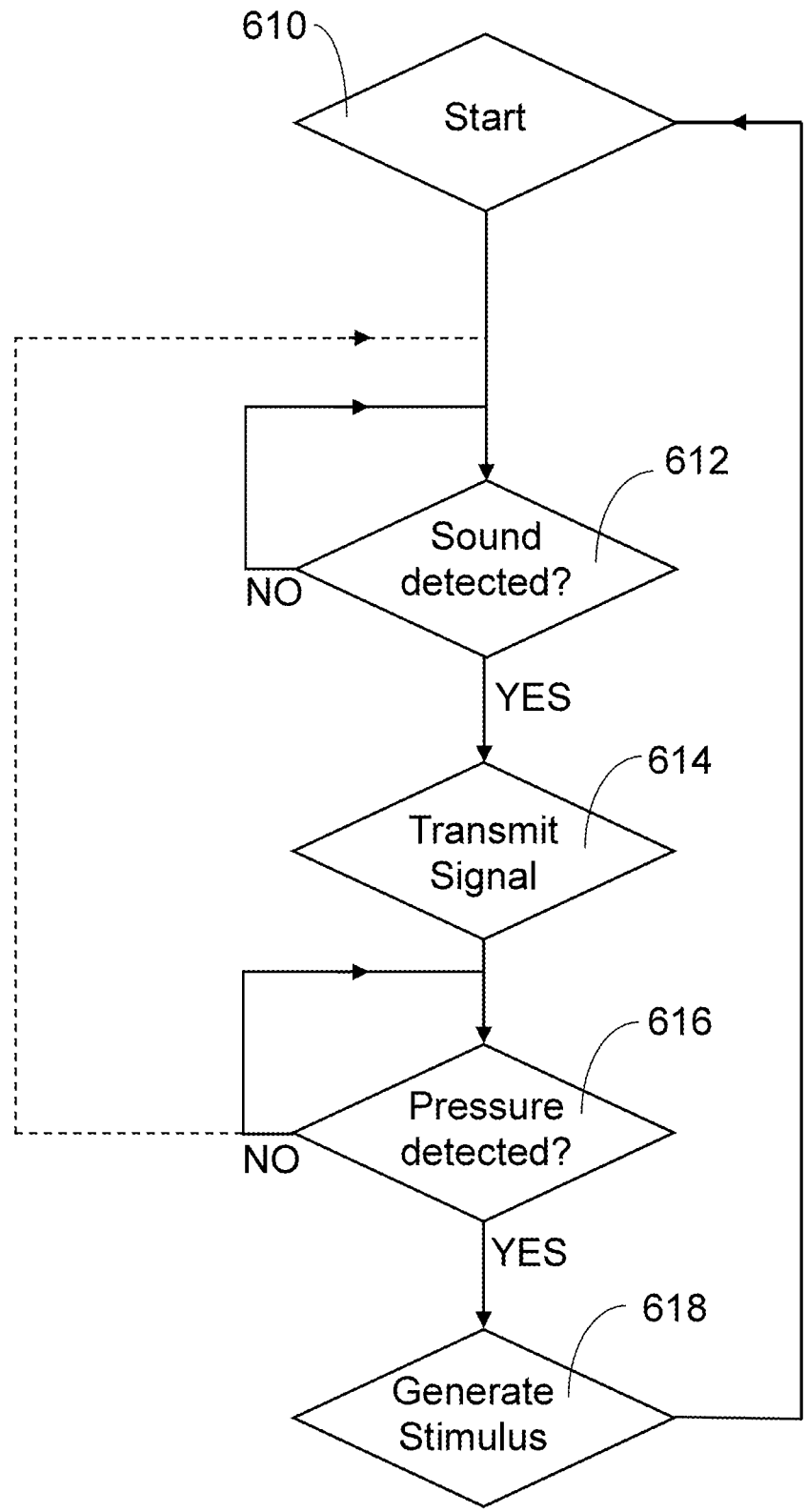
FIG. 6C illustrates another operational routine for operation of the personal alarm system according to the various embodiments.

FIG. 6C illustrates an alternative to the routine shown in FIG. 6B. For example, FIG. 6B may be categorized as a parallel routine whereas FIG. 6C may be characterized as a serial routine. The routine of FIG. 6B may function to continually be detecting for the presence of sound and/or pressure, but still treat the detected sound as the primary kick-off event for stimulus generation. For example, if pressure is detected before sound, a signal and/or flag indicative of the detected pressure may be sent and/or stored in memory of the applicable (receiver/transmitter/transceiver) module (see for example the two-way communication between stages 614 and 616 in FIG. 6B), but the routine may be configured to await a subsequent confirmatory detection of sound within a certain specified (detection) period. The routine may then proceed to stimulus generation based on the true values for each pressure and sound if detection of each within the detection period is realized. If the delay between detected pressure and sound (or vice versa) is too long (exceeds the prescribed detection period/threshold), the routine may be configured to revert and start over, e.g., from the start of the routine or from another desired point in the routine. In FIG. 6C, the routine may be configured so that detection of pressure may only be initiated based first on a detection of sound. For example, if sound is not detected in the routine of FIG. 6C, the routine may not progress to the detection of pressure—instead it may continually loop back to detect sound until sound is detected. The routines in FIGS. 6B and 6C are not limiting, and other routines that mix various elements of FIGS. 6B and 6C or other modifications are envisioned. For example, the various "NO" loops may be configured in various manners to arrive at the desired operation, such as shown by the dashed-line "NO" loop in FIG. 6C that is associated with stage 616, in which the dashed-line "NO" loop jumps back to a beginning point of the routine prior to the sound detection (instead of jumping to just prior to stage 616 as shown by the solid-line "NO" loop associated with stage 616). The "NO" loop(s) of the routine of FIG. 6B may be similarly configured or configured in other desired manners.

Figure 7:
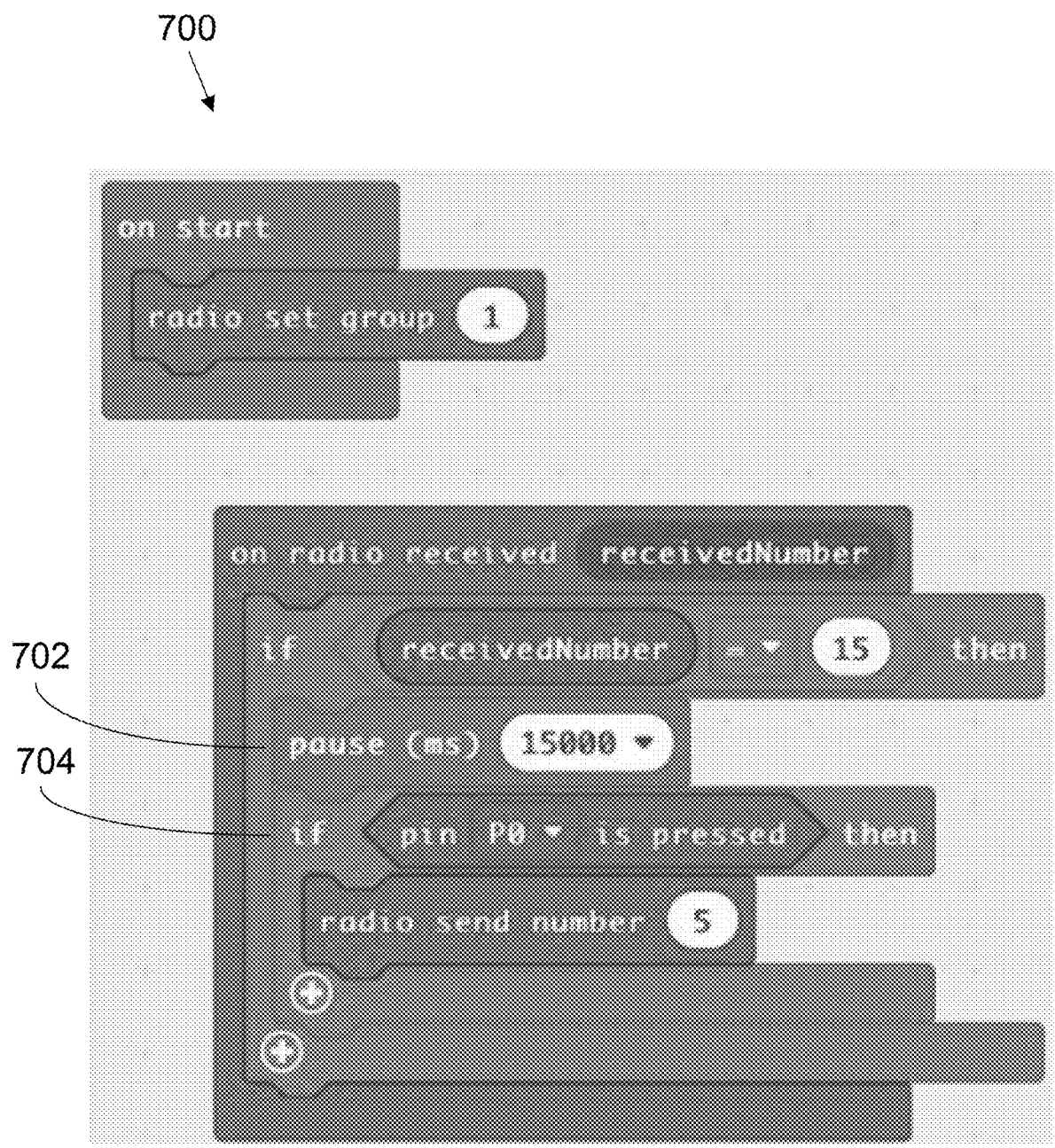
FIG. 7 illustrates receiver code according to various embodiments.

FIG. 7 illustrates receiver code 700 according to the various embodiments herein. For example, at code portion 702, a 15000 ms detection period can be set in conjunction with code portion 704, which checks if the pressure sensor has been triggered/pressed. The length of this period is merely for example and is not limiting, and may be shorter or longer to arrive at desired operation. The (detection) period (e.g., 15000 ms) as shown in FIG. 7 may be implemented at any desired point in any of the routines/embodiments described and envisioned herein, such as but not limited to those shown in FIGS. 6A to 6C and described herein, and may be used at more than one point of the routine, for either of sound and/or pressure detection purposes (e.g., to permit detection in any order, as described herein).

Figure 8:
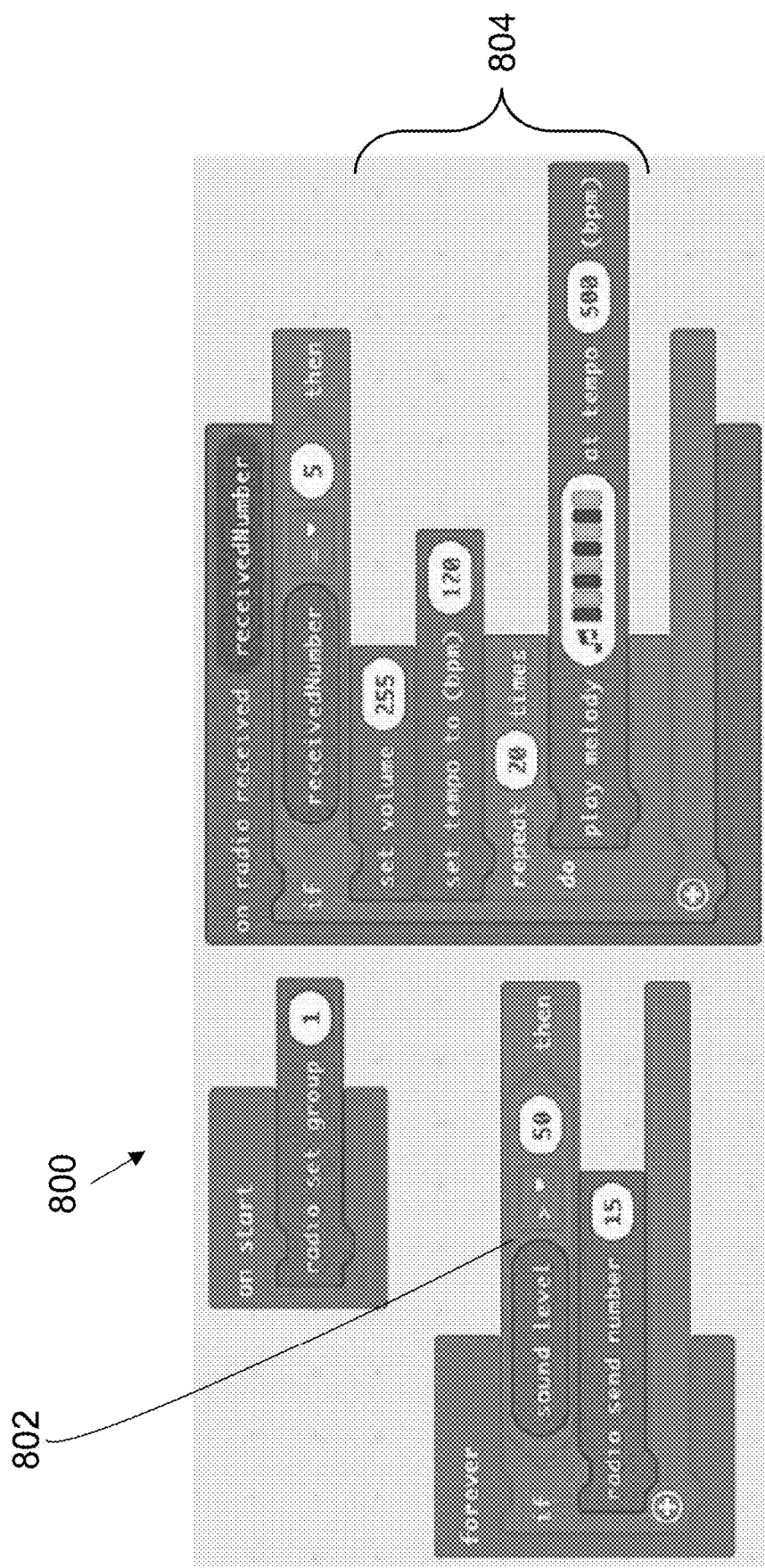
FIG. 8 illustrates transmitter code according to various embodiments.

FIG. 8 illustrates transmitter code 800 according to the various embodiments herein. At code portion 802, the transmitter monitors for a sound such as an alarm from an alarm clock adjacent the transmitter. At code portion 804, an audible alert stimulus generated by the transmitter is defined, including, for example, a volume, temp and repeat frequency of a melody to be played, such melody serving as the audible alert once it is detected that the user's head is still on the pillow despite the original alarm from the alarm clock having went off. The characteristics of the audible alert by the transmitter are not limiting, and the volume, temp, and repeat duration may be set as desired. Moreover, a code portion similar to code portion 804 may also be used at the receiver side, so that the receiver may generate a stimulus at the receiver which is in/on the pillow. The stimulus is not limited to the melody illustrated in FIG. 8, but can also include a vibration/rumble/haptic feedback by the receiver. Thus, vibration parameters similar to the melody parameters in code portion 804 may be defined, including, for example, the have the receiver vibrate at a certain strength for a certain duration of time and/or be repeated a certain number of times.

Figure 9:
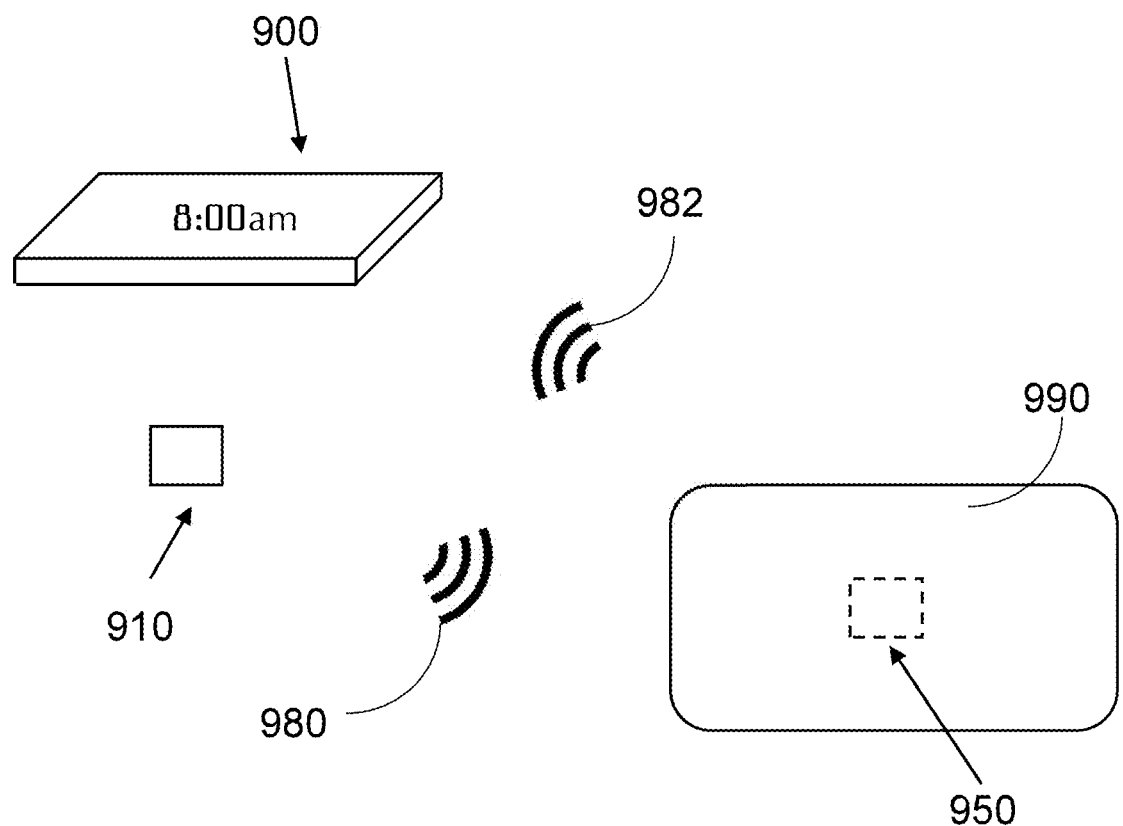
FIG. 9 illustrates an alternative embodiment of the personal alarm system.

FIG. 9 illustrates an embodiment where the personal alarm system (910 and 950) is capable of interacting with alarm-producing device 900 adjacent transmitter 910. The personal alarm system may have interface capabilities with the alarm-producing device 900. For example, in the scenario where the alarm-producing device 900 is a smart device such as a tablet, smartphone or the like, there may be a downloadable application (e.g., from a corresponding application store or other provider) that allows for the personal alarm system to interface with the smart device via the application downloaded to and installed on the smart device. This may be used, for example, to allow for the personal alarm system to alter certain operational characteristics of the alarm-producing device 900 itself, for example to increase the volume at the alarm-producing device itself, via control from the receiver 950. For example, if the receiver 950 detects pressure indicating a sleeping user and indication from the transmitter 910 that a sound from device 900 was detected, and if the personal alarm system is paired with the smart device (e.g., via Bluetooth, WiFi, and the like), then continued pressure detection at the receiver (i.e., after receipt of the initial sound indication signal from the transmitter) may trigger a signal to be sent from the receiver 950 to the smart device 900 to increase the volume at the smart device, to further assist in waking the user. This is just one example of how the personal alarm system 910/950 can be interfaced with an alarm device such as smart device 900. Other control aspects are envisioned beyond volume control, including but not limited to controlling a power/vibration state of the alarm device via the personal alarm system, all with the aim of being able to further generate stimuli to aid in waking the (still-sleeping) user. The smart device 900 could also be a smart alarm clock (e.g., WiFi enabled alarm clock), or other voice-assistant type devices such as Alexa-enabled devices and the like.

FIG. 10 illustrates an alarm device 1000 corresponding with other alarm devices described herein, a transmitter 1010 corresponding with other transmitters described herein, a pillow 1090, and a mattress 1093 covered by a sheet 1094. A receiver/detector 1050 is located under the sheet 1094 such that housing 1070 is on a surface of the mattress 1093 on which the user will lay on when sleeping. The receiver 1050 is in operative communication with transmitter 1010 by way of wireless communication 1080 corresponding with either wireless transmissions described herein. Because the mattress provides more surface area, the receiver may be scaled to a size in accordance with the mattress, and to improve the likelihood of accurate detection of forces applied by the user's body onto the mattress. The receiver may extend a length generally matching the length from a user's head to torso, or can be full body length. Thus, FIG. 10 illustrates an embodiment where the receiver/force detector is not in/on the pillow but rather in/on the mattress, for example on a top surface of the mattress. But the other aspects of the transmitter and receiver are the same as described herein (except for the size of housing 1070 of detector 1050), and as such detector 1050 can vibrate or create a local alert at the mattress once the flag conditions described herein occur.

The sound may be something other than an alarm from an alarm clock. For example, the transmitter unit may be positioned near any sound-making object (inanimate or otherwise). And certain buffer periods may be used, for example the stimulus unit may generate a stimulus for a certain amount of time past the triggering moment. Other detection mechanisms may be used, including but not limited to a position sensor, which, upon detection of a position change in response to a user's head on the pillow, triggers the same response described herein in the other embodiments using different detection mechanisms. For example, instead of the detection system of the embodiment of FIGS. 4A-4C, a detection position system may instead track the position of an element, wherein such position may be indicative of pressure/no pressure, and thus be useful in the same manner described herein for detecting a sleeping user. Such position sensor may be in the form of a Hall switch or other component (physical or electronic) capable of detecting a position change.

The pressure sensor(s) described herein may be a simple (e.g., physical) switch structure or may be based, for example, on sensors that utilize absolute, gauge, or differential measurements. The sensing of the sensors may be by way of resistive, capacitive, piezoelectric, optical, or microelectromechanical system (MEMS) sensing. The sensors may include but are not limited to strain gauge-type sensors, solid-state sensors, and micromachined silicon (MMS) sensors. For example, the strips 472A/B may instead comprise one or more strain gauges sensors, that when strained due to the head weight of a user, will generate a certain output/signal indicative of pressure detection. The (pressure) sensors may include a differential pressure transducer, a piezoelectric pressure sensor (e.g., fully piezo-resistive silicon pressure sensor), a MEMS pressure sensor, a diaphragm-based pressure sensor (e.g., membrane-based pressure sensor), etc. For example, thin- or thick-film sensor technologies may be used (e.g., metal thin-film, ceramic thick-film). Variable capacitance pressure sensors may be used, and other resistive or capacitive properties may be utilized to aid in pressure sensing. The sensors may comprise technology comprising piston technology, mechanical deflection, piezoelectric materials, vibrating elements, be semiconductor-based, and the like. Also, sensor materials comprising various (e.g., semiconducting) materials capable of use in pressure-sensing applications may be utilized (e.g., organic or polymer semiconductors). Materials capable of being used in flexible sensors, such as graphene-based materials (e.g., graphene oxide), ZnO, and carbon-based materials (e.g., carbon black (CB), carbon nanotubes) may be used.

In addition to or in the alternative the embodiments above, the detection mechanism may comprise components that may generate a continuity state. For example, as described herein, the detection mechanism may comprise at least two layers of thin, conductive material that may be configured in an overlapping relationship (e.g., one piece of material overlaid on the other). Under the weight of the user's head, the two layers may be in direct mechanical and/or electrical communication with one another. The materials may be of a resilient or otherwise biased construction or spaced apart so that under no weight, the layers are not in mechanical and/or electrical communication with one another. For example, in a state where the materials physically touch, a continuity exists, and this continuity can be used to set various states of the system. For example, if continuity is detected, this continuity may be used as being representative of a user's head being on the pillow, which is assumed to be a sleep state. On the other hand, if no continuity is detected, this can be used by the system as being representative of a state where the user's head is not on the pillow, and thus treated as being representative of a non-sleeping state. These are but two examples of how the continuity pay be used to control system operation, and is not limiting.

Having the transmitter unit adjacent a sound-emitting source allows for more accurate sound detection compared to if the receiver unit alone served as both a sound and pressure detecting unit. For example, since a main usage of the receiver unit is inside of a pillow, even if the receiver unit has its own sound-detecting functionality, the material of the surrounding pillow would impact the ability of the receiver unit to detect the sound. While the receiver is envisioned as producing a stimulus to wake the user at the pillow, the transmitter may also generate stimulus (e.g., sound, etc.) to further supplement or assist in waking the user.

The portability of the system promotes not only use in a user's home/residence, but also use during travel. For example, the system may be used in conjunction with an alarm clock in a hotel room. Or, if a person schedules a wake-up call from the from desk, the system (e.g., the transmitter/sound detection unit) will simply detect the ringing hotel phone. Or a user can use their own cellphone or other device (e.g., tablet, smartwatch, etc.) to generate an alarm that is sensed by the system. The system may thus serve as a redundancy safeguard to make sure a user wakes up for an important event (e.g., job interview or other important meeting), or just for normal day-to-day usage (e.g., if a user generally has difficulty waking up even with an alarm). While use of a pillow as the sleeping aid is a main embodiment, this is not limiting. For example, the sleeping aid may be a mattress, and the personal alarm system may be used under the sheets of the mattress. In the case where the sleeping aid is a mattress, the detector maybe placed under the user's torso instead of the head. But this is not limiting, and the detector can be placed under the sheet adjacent the user's pillow, or placed so as to be under some other body part (e.g., hip, etc.). And while FIGS. 3A-3E and 4A-4C illustrate the detector being inside the pillow (e.g., in the middle of the pillow), the detector can be placed inside or adjacent the pillow in a variety of arrangements. For example, the detector can be outside of but under the pillow (e.g., under the pillow but on top of the sheet of the mattress, or under the pillow and under the sheet of the mattress). The detector can be under the pillow case and on the top surface of the pillow body closest to the user's face, or inside the pillow case and under the bottom surface of the pillow body away from the user's face. These placements are not limiting so long as the detector is able to detect pressure as needed for operational integrity.

In the present disclosure, all or part of the units or devices of any system and/or apparatus, and/or all or part of functional blocks in any block diagrams and flow charts may be executed by one or more electronic circuitries including a semiconductor device, a semiconductor integrated circuit (IC) (e.g., such as a processor, CPU, etc.), or a large-scale integration (LSI). The LSI or IC may be integrated into one chip and may be constituted through combination of two or more chips. For example, the functional blocks other than a storage element may be integrated into one chip. The integrated circuitry that is called LSI or IC in the present disclosure is also called differently depending on the degree of integrations, and may be called a system LSI, VLSI (very large-scale integration), or ULSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Any database/ recording medium/storage medium or the like referenced herein can be embodied as one or more of ROMs, RAMs, optical disks, hard disk drives, other solid-state memory, servers, cloud storage, used in isolation or in combination, and so on and so forth. Furthermore, part or all of the functions or operations of units, devices or parts or all of devices can be executed by software processing (e.g., coding, algorithms, etc.). The software is recorded in a non-transitory computer-readable recording medium, such as one or more ROMs, RAMs, optical disks, hard disk drives, solid-state memory, servers, cloud storage, and so on and so forth, having stored thereon executable instructions which can be executed to carry out the desired processing functions and/or circuit operations. For example, when the software is executed by a processor, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface). The wireless communication (e.g., 180 and the like) may be in the form of WiFi, Bluetooth, cellular, or other wide- or narrow-band wireless communication protocols.

The software may be stored on the applicable hardware components of the pillow alarm device, and may comprise learning capabilities allowing for the user's sleeping patterns to be learned over time. The learned behavior may then be used to set or otherwise alter the operation of the system, such as by automatically updating the alarm time or other functional aspects (e.g., increasing strength of stimulus). Pattern recognition, machine learning or other artificial intelligence techniques may be used to arrive at the automated operation. For example, the unit may be programmed with a base sleep model for sleep tracking from sample sleep data, where such model may be updated over time as new personalized sleep data of the user is acquired and fed into the model.

The embodiments were chosen and described in order to best explain the principles of the disclosure and its practical application to thereby enable others skilled in the art to best utilize the disclosure in various embodiments and with various modifications as are suited to the particular use contemplated. Aspects of the disclosed embodiments may be mixed to arrive at further embodiments within the scope of the invention.

As various modifications could be made in the constructions and methods herein described and illustrated without departing from the scope of the disclosure, it is intended that all matter contained in the foregoing description or shown in the accompanying drawings and/or appendices shall be interpreted as illustrative rather than limiting. Thus, the breadth and scope of the present disclosure should not be limited by any of the above-described exemplary embodiments, but should be defined only in accordance with the following claims appended hereto and their equivalents.

What is claimed is:

1. A personal alarm apparatus comprising:
a sound source, the sound source settable to a time to produce a sound transmission as a sound signal;
a transmitter configured for placement adjacent the sound source, the transmitter comprising at least one sound-detecting sensor calibrated to (i) detect sound signals based upon at least one attribute associated with the sound signal, (ii) ignore sound signals without the at least one attribute associated with the sound signal, and (iii) receive the sound signal from the sound source upon detection of the at least one attribute, and control circuitry configured to transmit a detected sound transmission;
a receiver, the receiver being remote from the transmitter and configured for placement adjacent a sleeping aid to which a user will apply force, the receiver comprising at least one force-detecting sensor, at least one stimulus-generator, and control circuitry;
wherein upon detection by the transmitter of the sound signal from the sound source by the at least one sound-detecting sensor, the transmitter control circuitry transmits the detected sound transmission to the receiver;
wherein when the receiver control circuitry (i) receives the detected sound transmission and (ii) detects applied force from at least one body part of the user on the sleeping aid via the at least one pressure-detecting sensor within a predetermined period of time, a local stimulus is generated by the at least one stimulus-generator adjacent the sleeping aid;
wherein active operation of the at least one force-detecting sensor is conditioned by reception of the detected sound transmission by the receiver control circuitry, reception of the detected sound transmission initializing active operation of at least one force-detecting sensor to detect applied force from at least one body part of the user upon the sleeping aid; and
wherein the receiver control circuitry transmits a signal to the sound source to increase the volume of the sound signal when the at least one pressure-detecting sensor continuously detects applied force from the at least one body part of the user on the sleeping aid.

2. The personal alarm apparatus according to claim 1, wherein the sleeping aid is a pillow.

3. The personal alarm apparatus according to claim 1, wherein the sleeping aid is a mattress.

4. The personal alarm apparatus according to claim 1, wherein the sound source is an alarm clock.

5. The personal alarm apparatus according to claim 1, wherein the sound source is a personal computing device capable of generating the sound transmission.

6. The personal alarm apparatus according to claim 5, wherein at least one of the transmitter or the receiver is in operative communication with the personal computing device, and the at least one of the transmitter or the receiver is configured to control an operational parameter of the personal computing device.

7. The personal alarm apparatus according to claim 1, wherein the at least one force-detecting sensor is selected from the group comprising: a pressure sensor, a position switch, at least one strip of conductive material, and a strain gauge.

8. The personal alarm apparatus according to claim 1, wherein the receiver comprises a substrate, and the at least one force-detecting sensor is on or embedded, in whole or in part, within the substrate.

9. The personal alarm apparatus according to claim 8, wherein the substrate comprises a pliable material configured to conform to a shape of the sleeping aid, and the local stimulus is selected from the group comprising: a vibration and an audible alert.

10. The personal alarm apparatus according to claim 1, wherein the at least one force-detecting sensor comprises a plurality of force-detecting sensors.

11. The personal alarm apparatus according to claim 1, wherein the at least one body part is the user's head, and the applied force is a force applied from the user's head to the sleeping aid.

12. The personal alarm apparatus according to claim 1, wherein the sleeping aid is a pillow, the receiver is positioned under a surface the pillow, and the at least one force-detecting sensor comprises two conductive sheets that are configured to form a continuity path under applied force from the at least one body part of the user to another surface of the pillow opposite the surface the receiver is under.

13. The personal alarm apparatus according to claim 1, wherein the sleeping aid is a mattress and the receiver is on a surface of the mattress such that the force applied by the at least one body part of the user is detected by the at least one force-detecting sensor of the receiver.

14. A method for generating a personal alarm, comprising:
setting a sound source to a time to produce a sound transmission as a sound signal:
calibrating at least one sound-detecting sensor of a transmitter to (i) detect sound signals based upon at least one attribute associated with the sound signal, and (ii) ignore sound signals without the at least one attribute associated with the sound signal;
placing the transmitter adjacent the sound source, the transmitter further comprising control circuitry;
placing a receiver remote from the transmitter and adjacent a sleeping aid to which a user will apply force, the receiver comprising at least one force-detecting sensor, at least one stimulus-generator, and control circuitry;
detecting, by the at least one sound-detecting sensor of the transmitter, the at least one attribute associated with the sound signal produced by the sound source;
receiving the sound signal from the sound source via the at least one sound-detecting sensor based upon calibration of the at least one sound-detecting sensor;
via the transmitter control circuitry: (i) processing the sound signal, (ii) generating detected sound data, and (iii) transmitting, from the transmitter to the receiver, a detected sound transmission based on the generated detected sound data;
via the receiver control circuitry: (i) receiving the transmitted detected sound transmission, (ii) processing data associated with the transmitted detected sound transmission, and (iii) generating a receiver-side sound indicator;
activating the at least one force-detecting sensor into an operational state based upon receiving the transmitted detected sound transmission reception at the receiver control circuitry, aid;
detecting, via the at least one force-detecting sensor, a force applied to the sleeping aid by at least one body part of the user, and, via the receiver control circuitry: (i) processing the detected force, and (ii) generating a receiver-side force indicator;
generating, via the at least one stimulus-generator, a local stimulus adjacent the sleeping aid when the receiver-side sound indicator and the receiver-side force indicator occur within a predetermined time period of one another; and upon continued detection of the force applied to the sleeping aid by at least one body part of the user by the at least one force-detecting sensor, transmitting, via the receiver control circuitry, a signal to the sound source to increase the volume of the sound signal.

15. The method for generating a personal alarm according to claim 14, wherein the receiver is placed on, under, or inside the sleeping aid, and the sleeping aid is selected from the group comprising: a pillow and a mattress.

16. The method for generating a personal alarm according to claim 14, wherein the sound source is selected from the group comprising: an alarm clock and a personal computing device capable of generating a sound.

17. The method for generating a personal alarm according to claim 16, further comprising transmitting an operational parameter for the personal computing device from the receiver to the personal computing device, and controlling the personal computing device to operate according to the operational parameter.

18. The method for generating a personal alarm according to claim 14, wherein the at least one force-detecting sensor is selected from the group comprising: (i) a pressure sensor, (ii) a position switch, (iii) at least one strip of conductive material, and (iv) a strain gauge, and the local stimulus is selected from the group comprising: a vibration and an audible alert.

19. An article of manufacture for a personal alarm system configured to be used adjacent a sleeping aid on which a user will apply force, the article of manufacture comprising:

a first non-transitory computer-readable recording medium of a transmitter having stored thereon first machine-readable code, wherein the first machine-readable code defines operations to be performed by a first processor of the transmitter to cause the first processor to:

calibrate at least one sound-detecting sensor of the transmitter to detect sound signals based upon at least one attribute associated with a sound signal;

calibrate at least one sound-detecting sensor of the transmitter to ignore sound signals without the at least one attribute associated with the sound signal;

detect the sound signal from a sound source adjacent the transmitter via at least one sound-detecting sensor of the transmitter;

receive the sound signal via the at least one sound-detecting sensor of the transmitter according to the calibration of the at least one sound-detecting sensor;

process the sound signal;

generate detected sound data;

transmit, from the transmitter to a receiver, a detected sound transmission based on the generated detected sound data;

a second non-transitory computer-readable recording medium of a receiver being remote from the transmitter, the receiver having stored thereon second machine-readable code, wherein the second machine-readable code defines operations to be performed by a second processor of the receiver to cause the second processor to:

receive the transmitted detected sound transmission;

process data associated with the transmitted detected sound transmission;

generate a receiver-side sound indicator;

detect, via at least one force-detecting sensor of the receiver, a force applied to the sleeping aid by at least one body part of the user;

process data based on the detected force;

generate a receiver-side force indicator;

transmit, upon continued detection of the force applied to the sleeping aid by at least one body part of the user by the at least one force-detecting sensor, a signal to the sound source to increase the volume of the sound signal;

wherein when the receiver-side sound indicator and the receiver-side force indicator are each generated within a predetermined time period of one another, and generate, via a stimulus-generator of the receiver, a local stimulus adjacent the sleeping aid; and wherein active operation of at least one force-detecting sensor to detect applied force from at least one body part of the user is initiated by way of reception of the detected sound transmission by the receiver control circuitry aid.

20. The article of manufacture according to claim 19, wherein the local stimulus is at least one of a vibration and an audible alert.

* * * * *